(12) United States Patent
Cao et al.

(10) Patent No.: US 8,978,293 B2
(45) Date of Patent: Mar. 17, 2015

(54) PROCESS FOR THE PRODUCTION OF USEFUL MATERIALS FOR SUSTAINING MANNED SPACE MISSIONS ON MARS THROUGH IN-SITU RESOURCES UTILIZATION

(75) Inventors: Giacomo Cao, Cagliari (IT); Alessandro Concas, Cagliari (IT); Gianluca Corrias, Ardauli (IT); Roberta Licheri, Quartu S. Elena (IT); Roberto Orru', Cagliari (IT); Massimo Pisu, Quartu S. Elena (IT)

(73) Assignees: Universita Degli Studi di Cagliari, Cagliari (IT); A.S.I. Agenzia Spaziale Italiana, Rome (IT); Centro di Ricerca, Sviluppo e Studi Superiori in Sardegna Societa a Responsabilita Limitata, Cagliari (IT)

( * ) Notice: Subject to any disclaimer, the term of this patent is extended or adjusted under 35 U.S.C. 154(b) by 0 days.

(21) Appl. No.: 14/235,549
(22) PCT Filed: Jul. 24, 2012
(86) PCT No.: PCT/IB2012/053754
§ 371 (c)(1),
(2), (4) Date: Jan. 28, 2014
(87) PCT Pub. No.: WO2013/014606
PCT Pub. Date: Jan. 31, 2013

(65) Prior Publication Data
US 2014/0165461 A1 Jun. 19, 2014

(30) Foreign Application Priority Data
Jul. 28, 2011 (IT) .............................. MI2011A1420

(51) Int. Cl.
*A01G 9/18* (2006.01)
*A01G 15/00* (2006.01)
(Continued)

(52) U.S. Cl.
CPC ............... *A01G 15/00* (2013.01); *E21C 51/00* (2013.01); *C25B 15/08* (2013.01); *C25B 9/18* (2013.01)
USPC ............ 47/17; 47/1.01 R; 47/1.4; 47/58.1 SC

(58) Field of Classification Search
USPC ............... 47/17, 1.01 R, 1.4, 18.1 R, 58.1 SC
See application file for complete search history.

(56) References Cited

U.S. PATENT DOCUMENTS

| 4,583,321 A * | 4/1986 | Stanhope ................... 47/58.1 R |
| 5,005,787 A | 4/1991 | Cullingford |

(Continued)

FOREIGN PATENT DOCUMENTS

| GB | 2234147 A | 1/1991 |
| JP | 2002104811 A | 4/2002 |

OTHER PUBLICATIONS

Yamashita et al., "On-Site Resources Availability for Space Agriculture on Mars," The Azolla Cooking and Cultivation Project, Department of Botany, (2011) Stockholm University.

(Continued)

*Primary Examiner* — David Parsley
*Assistant Examiner* — Marc Burgess
(74) *Attorney, Agent, or Firm* — LeClairRyan, a Professional Corporation

(57) ABSTRACT

A process for the production of useful materials to sustain manned space missions on Mars, as well as the kit of materials and apparatus for implementing the same, is described. Said process uses as raw feedstock only natural resources available in-situ, namely Mars atmosphere and regolith. The kit allows to implement the process of the invention by providing all materials and apparatus that will be used on the Martian soil.

8 Claims, 3 Drawing Sheets

(51) Int. Cl.
*E21C 51/00* (2006.01)
*C25B 15/08* (2006.01)
*C25B 9/18* (2006.01)

(56) References Cited

U.S. PATENT DOCUMENTS

| | | | |
|---|---|---|---|
| 5,227,032 A | | 7/1993 | Sullivan |
| 5,956,897 A | * | 9/1999 | Takashima ............ 47/60 |
| 2013/0118112 A1 | * | 5/2013 | Cao et al. ............ 52/741.1 |

OTHER PUBLICATIONS

McKay et al., "Utilizing Martian resources for life support," University of Arizona Press, pp. 819-843 (2008) Tucson, Arizona.
Bruckner et al., "Feasibility Studies of the Extraction of Water Vapor From the Martian Atmosphere by Adsorption in Zeolite 3A," ISRU Technical Interchange Meeting, (2000) Houston, Texas.
Robinson, "Red Mars," Polvo Estelar, (MX) Bantam Spectra, pp. 535-1101 (1992).
International Search Report and Written Opinion for corresponding application PCT/IB2012/053754 mailed Nov. 21, 2012 (9 pages).

* cited by examiner

PROCESS FOR THE PRODUCTION OF USEFUL MATERIALS FOR SUSTAINING MANNED SPACE MISSIONS ON MARS THROUGH IN-SITU RESOURCES UTILIZATION

FIELD OF INVENTION

The present invention concerns a process which exploits natural resources available on Mars for producing useful materials for the sustainment of manned space missions on Mars as well as the kit of materials and apparatus for implementing the same.

STATE OF THE ART

It is well known the NASA interest to undertake in the next 40 years manned missions on asteroids, Moon and Mars. In particular, NASA has recently announced a mission to the Moon by 2020 and to Mars after 2030.

Specifically, within the framework of the current space exploration programs, the acronyms ISRU (In Situ Resource Utilization) and ISFR (In Situ Fabrication and Repair) are well known. The first acronym is related to the use of resources already available on Moon, Mars and/or asteroid, while the second one addresses the development of manufacturing maintenance and repair technologies, which allows longer manned missions duration and cost reduction.

In such framework, novel technologies for the production of food and water through recycling of liquid and solid wastes produced by astronauts, have been developed. These technologies involve also the production of energy starting from renewable sources as well as the capture and the recycling of CO2 that constitutes, for example, the Martian atmosphere.

As far the above targets are concerned, in the framework of the research activities carried out on behalf of the International Space Station (ISS), a set of technologies, typically referred with the acronym ECLSS—Environmental Control and Life Support System, has been developed (J F Lewis, et al. International space station (ISS) Environmental controls and life support system (ECLSS) manual oxygen management. In: International Conference on Environmental Systems, Rome, Italy, (2005)).

The current ECLSS systems are not completely self-sustaining thus requiring the integration of external inputs of oxygen, food and water to meet the astronauts needs. Since 1988, with the aim of implementing ECLSS paradigms on the real scale, ESA (European Space Agency) is working at the project MELISSA (Micro Ecological Life Support System Alternative), which involves the realization of a closed loop process (i.e. producing all the materials needed by the crew only through recycling of waste and energy) for creating, within the crew cabin, suitable conditions that allow the crew members to survive and work during long-term permanent missions on Moon and Mars (Mergeay, M., Verstraete, W. MELISSA: a microorganism based model for CELSS development, in: Proceedings of the Third Symposium on Space Thermal Control & Life Support System. Noordwijk, The Netherlands, pp. 65-68, 1988).

Although the ultimate goal of the MELISSA project is to achieve a self-sustaining system, modeling simulations have shown that even the minimal goal of getting 100% of oxygen and 20% of food required by crew members through waste recycling is not achievable through the current technology (L. Poughon, L., Farges, B., Dussap, C. G., Godia, F., Lasseur, C. "Simulation of the MELiSSA closed loop system as a tool to define its integration strategy" Advances in Space Research, 44, 1392-1403 (2009).

Therefore novel processes are needed for the obtainment of products such as water, oxygen, propellants, fertilizers, edible biomass and vegetables starting from Martian resources, which, by synergically operating with the current ECLSS technologies, enable the development of a self-sustaining/closed-loop system that overcomes the drawbacks above described for the current technologies.

SUMMARY OF THE INVENTION

The object above has been achieved by a process the production of oxygen, water, carbon monoxide, ammonia, nitrogen fertilizers and edible biomass on the Martian soil through the use of available resources in situ, said process comprising two sections, namely a chemical-physical section for producing oxygen, water, carbon monoxide, ammonia, and nitrogen-based fertilizers, and a biological section for producing edible biomass.

Particularly, said chemical-physical section comprises the steps of:

a) assembling on the Martian surface at least one geodesic dome to house the plant units operating indoor;
b) assembling outdoor photovoltaic panels to produce energy needed for heating inside the at least one dome and for powering plant of said plant units;
c) assembling outdoor a variable-temperature adsorption unit (Temperature Swing Adsorber or TSA) and a solid-state dehumidifier (Water Vapor Adsorption Reactor or WAVAR);
d) blowing pressurized Martian $CO_2$ into said at least one dome, through TSA, until an internal pressure not less than 0.8 bar is achieved;
e) heating the interior of said at least one dome until a temperature not less than 10° C. is achieved, through heating systems powered by said photovoltaic panels;
f) assembling a structure for the mechanical protection of plant units operating outdoor;
g) placing inside the at least one dome the plant units for the production of fertilizers;
h) conveying the gas consisting of Martian atmosphere to the WAVAR unit, which operates outdoor, for the atmospheric water extraction;
i) excavating and conveying the Martian regolith to an indoor system named MPO (Microwave Oven Pizza), for the extraction of adsorbed water and minerals' hydration water, by microwaves;
j) conveying the water extracted from Martian atmosphere to a storage tank;
k) splitting the water extracted from the regolith in three streams named $\pi 1$, $\pi 2$, and $\pi 3$;
l) conveying the water stream $\pi 1$ to an electrolyzer operating indoor to produce two distinct streams of $H_2$ and $O_2$;
m) conveying the dehydrated atmosphere outcoming from the unit WAVAR to the system TSA of separation and pressurization of $CO_2$, based on cycles of adsorption-desorption at variable temperatures on zeolitic materials, simultaneously producing a second gas stream which essentially consists of $N_2$ and Ar;
n) conveying the separated and pressurized $CO_2$ to an electrolyser for the production of $O_2$ and a gas stream consisting of a mixture of CO and $CO_2$ to be stored and used as a propellant for extravehicular activity;

o) conveying the second stream separated from the ISA, which essentially consists of $N_2$ and Ar, together with $H_2$ produced by electrolysis of water, into a reactor that allows the production, by electrosynthesis, of gaseous ammonia ($NH_3$), simultaneously producing a stream of Ar which is inert during the reactive process leading to the production of $NH_3$;

p) splitting the stream of produced $NH_3$ in two streams named θ1 and θ2;

q) conveying the stream of Ar coming from the electrosynthesis step (o), together with the stream θ1 of $NH_3$ (p), with the oxygen, produced as per step (l), with the stream of water π2 produced as per step (k), to a unit for the production of nitric acid ($HNO_3$) and an exhaust gas mainly consisting of Ar, which operates on the basis of the Ostwald process;

r) splitting the stream of the produced $HNO_3$ in two streams named ρ1 and ρ2;

s) further splitting the stream θ2 of $NH_3$ produced as per step (p) in two streams named θ2' e θ2";

t) conveying the stream θ2' to a storage tank from which drawing the $NH_3$ to be used as a propellant for extravehicular activity or as a fertilizer in hydroponics;

u) conveying the stream ρ1 of $HNO_3$ together with the stream θ2" of $NH_3$, produced as per step (s) in a reactor for the absorption and neutralization, which allows the production of ammonium nitrate ($NH_4NO_3$) to be used as fertilizer.

Said biological section comprises the steps of:

a') assembling on the Martian surface at least one geodesic dome to house the plant units operating indoor;

b') assembling outdoor photovoltaic panels to produce energy needed for heating inside the at least one dome and for powering plant of said plant units;

c') assembling outdoor a variable-temperature adsorption unit (Temperature Swing Adsorber or TSA) and a solid-state dehumidifier (Water Vapor Adsorption Reactor or WAVAR);

d') blowing pressurized Martian $CO_2$ into said at least one dome, through TSA, until an internal pressure not less than 0.8 bar is achieved;

e') heating the interior of said at least one dome until a temperature not less than 10° C. is achieved, through heating systems powered by said photovoltaic panels;

f') excavating and conveying the Martian regolith to an indoor system named MPO (Microwave Oven Pizza), for the extraction of adsorbed water and minerals' hydration water, by microwaves;

g') mixing the water produced with suitable amounts of nitric acid produced in said chemical-physical section;

h') splitting the dehydrated regolith produced as per step (f') into two distinct solid streams named $\tau_1$' and $\tau_2$';

I') conveying the water mixed with nitric acid produced in step (g') together with the solid stream $\tau_1$' of regolith in a leaching reactor for the transfer of micro- and macronutrients from the solid phase to the liquid phase;

j') conveying the mixture of solid and liquid (slurry) coming from the leaching reactor to a filtration system for the separation of the solid, named "leached regolith" from the liquid enriched in micro- and macronutrients, named "culture broth";

k') conveying the Martian atmosphere to the unit TSA of separation and pressurization of $CO_2$, based on cycles of adsorption-desorption at variable temperatures on zeolitic materials, simultaneously producing a second gas stream which essentially consists of $N_2$ and Ar;

l') storing said second gas stream of $N_2$ and Ar, produced as per step (k'), in suitable containers from which it can be drawn to be used as a buffer gas in analytical apparatus used during sampling steps to be carried out for scientific purposes during mission;

m') preparing an inoculum of suitable algal strains brought from Earth;

n') conveying the "culture broth" produced as per step (j'), together with the pressurized stream of $CO_2$, produced as per step (k'), together with $HNO_3$, produced in said chemical-physical section, and the inoculum produced as per step (m'), in at least one photobioreactor to be used to promote algal growth;

o') performing the $CO_2$ absorption in liquid phase through systems based on hydropneumatic pumps ("airlift") that allow proper mixing of components conveyed in the photobioreactor, and adequate circulation of the mixture of algae and culture medium, named "biological slurry";

p') exposing the at least one photobioreactor to a light source capable of promoting photosynthesis, thus resulting in the formation of new photosynthetic algae biomass and oxygen;

q') separating the algal biomass from the culture broth by centrifugation and oxygen by degassing;

r') storing oxygen to be conveyed to ECLSS sections (Environmental Control and Life Support System) in a sealed and pressurized tank, and further dehydrating algal biomass in order to use it as food or dietary supplement;

s') transferring the culture broth spent in step q'), together with ammonium nitrate ($NH_4NO_3$) produced in the chemical-physical section, the leached regolith, produced as per step (j'), with appropriate amounts of humic and fulvic acids brought from Earth, and human metabolic wastes, into the domes where plantations for food are grown.

In another aspect, the present invention concerns a kit of materials and apparatus for the implementation of the process of the invention, comprising two groups of parts, named "chemical physical" group and "biological" group. The "chemical physical" group of the kit comprises:

at least one geodesic dome to house the various units used in the chemical-physical section of the process;

at least one photovoltaic panel for producing the energy for heating the atmosphere inside the at least one dome and for functioning the plant units specified below;

at least one unit TSA consisting of at least one adsorbent bed of zeolite and at least one radiator having the function to ensure the heat exchange with the natural environment of Mars to allow the execution of adsorption-desorption cycles at variable temperature, for separating $CO_2$ from other constituents of the Martian atmosphere gases (mainly $N_2$ and Ar), and pressurizing the separated $CO_2$, as well as blowing and put the same pressure of $CO_2$ into the at least one dome;

at least one unit WAVAR based on the use of zeolites and adsorption process, followed by desorption with microwaves, for the extraction of water present in the Martian atmosphere;

at least one storage tank for water extracted from the atmosphere of Mars;

at least one excavator and at least one conveyor belt for the excavation and conveyance of the Martian regolith to the unit for processing the same;

at least one unit MPO, including at least one magnetron for the extraction of water adsorbed and hydration from the Martian regolith by using microwave heating;

at least one pipe connector having three outputs for splitting the water extracted from the regolith in three streams named $\pi 1$, $\pi 2$ and $\pi 3$;

at least one electrolyzer for electrolysis of water of the stream $\pi 1$, and the production of hydrogen and oxygen;

at least one electrolyzer for electrolysis of $CO_2$ and obtaining separated oxygen and a mixture of CO and $CO_2$;

at least one unit consisting of at least one electrosynthesis reactor with solid electrolyte (Solid oxide fuel cell) for the production of ammonia from gas with a high content of $N_2$ and Ar produced into the unit TSA and hydrogen obtained by electrolysis of water;

at least one unit consisting of a connector "T" for splitting the stream of produced ammonia in two streams, named $\theta 1$ and $\theta 2$;

at least one unit for the production of nitric acid ($HNO_3$) by Ostwald process from Ar, $NH_3$, $H_2O$, $O_2$, said unit comprising at least one catalytic reactor, at least one absorption tower and at least one system for stripping "NOx";

at least one unit consisting of a connector "T" for splitting the stream of produced nitric acid ($HNO_3$) in two streams, named $\rho 1$ and $\rho 2$;

at least one unit consisting of a connector "T" for splitting the stream $\theta 2$ into further two streams named $\theta 2'$ and $\theta 2''$;

at least one storage tank for the $NH_3$ produced; and at least one gas-liquid reactor operating continuously for the production of $NH_3$ and $NH_4NO_3$ from $HNO_3$.

The "biological" group comprises:

at least one geodesic dome to house the various units used in the biological section of the process;

at least one photovoltaic panel for producing the energy for heating the atmosphere inside the at least one dome and for functioning the plant units specified below;

at least one unit TSA consisting of at least one adsorbent bed of zeolite and at least one radiator having the function to ensure the heat exchange with the natural environment of Mars to allow the execution of adsorption-desorption cycles at variable temperature, for separating $CO_2$ from other constituents of the Martian atmosphere gases (mainly $N_2$ and Ar), and pressurizing the separated $CO_2$, as well as blowing and put the same pressure of $CO_2$ into the at least one dome;

at least one excavator and at least one conveyor belt for the excavation and conveyance of the Martian regolith to the unit for processing the same;

at least one unit MPO, including at least one magnetron for the extraction of water adsorbed and hydration from the Martian regolith by using microwave heating;

at least one unit for mixing the water extracted from the regolith with suitable amounts of nitric acid produced in the chemical-physical section;

at least one unit consisting of a two-way conveyor belt for splitting the regolith dehydrated in two solid streams named $\tau_1'$ and $\tau_2'$;

at least one reactor operating continuously for leaching of solid stream $\tau_1'$ of regolith with a mixture of water and nitric acid;

at least one unit consisting of a "plate filter" for the solid/liquid separation to be performed on the slurry outing the leaching reactor and the simultaneous production of "culture broth" and a stream of "leached regolith";

at least one tank for storing $N_2$ and Ar-based gas obtained by the previous unit as a result of separation from $CO_2$;

at least one of the following algal strains: *Gloeocapsa* strain OU_20, *Leptolyngbya* OU_13 strain, *Phormidium* strain OU_10, *Chroococcidiopsis* 029; *Arthrospira platensis*, *Synechococcus elongatus*, *Anabaena cylindrical*; *Chlorella vulgaris*; *Nannochloris Eucaryotum* or genetically modified strains;

at least one unit for the preparation of the inoculum of algal strains;

at least one photobioreactor for the production of algal biomass, wherein the culture broth contacts the algal inoculum, with nitric acid and the gas stream having a high content of $CO_2$ named $\theta 2$;

at least one hydropneumatic pump type "airlift" for the absorption of $CO_2$ in the liquid phase, the proper degree of mixing between components conveyed in the photobioreactor and the circulation of the "biological slurry";

at least one unit for the separation of algal biomass and oxygen produced in the photobioreactor from the spent culture broth;

at least one tank for storing oxygen produced by the photobioreactor;

at least one unit for the dehydration of algal biomass, and at least one geodesic dome to be used as a greenhouse for growing edible plants.

As will be apparent from the following detailed description, the kit of materials and apparatus as well as the process which employs it, allow the production of oxygen, water, carbon monoxide, ammonia, nitrogen fertilizers and edible biomass on the Martian soil through the use of natural resources available in situ.

BRIEF DESCRIPTION OF THE DRAWINGS

The features and advantages of the invention will be apparent from the following detailed description, from the working example provided for illustrative and non limiting purposes, and from the attached FIGS. wherein.

DETAILED DESCRIPTION OF THE INVENTION

Figure 1:
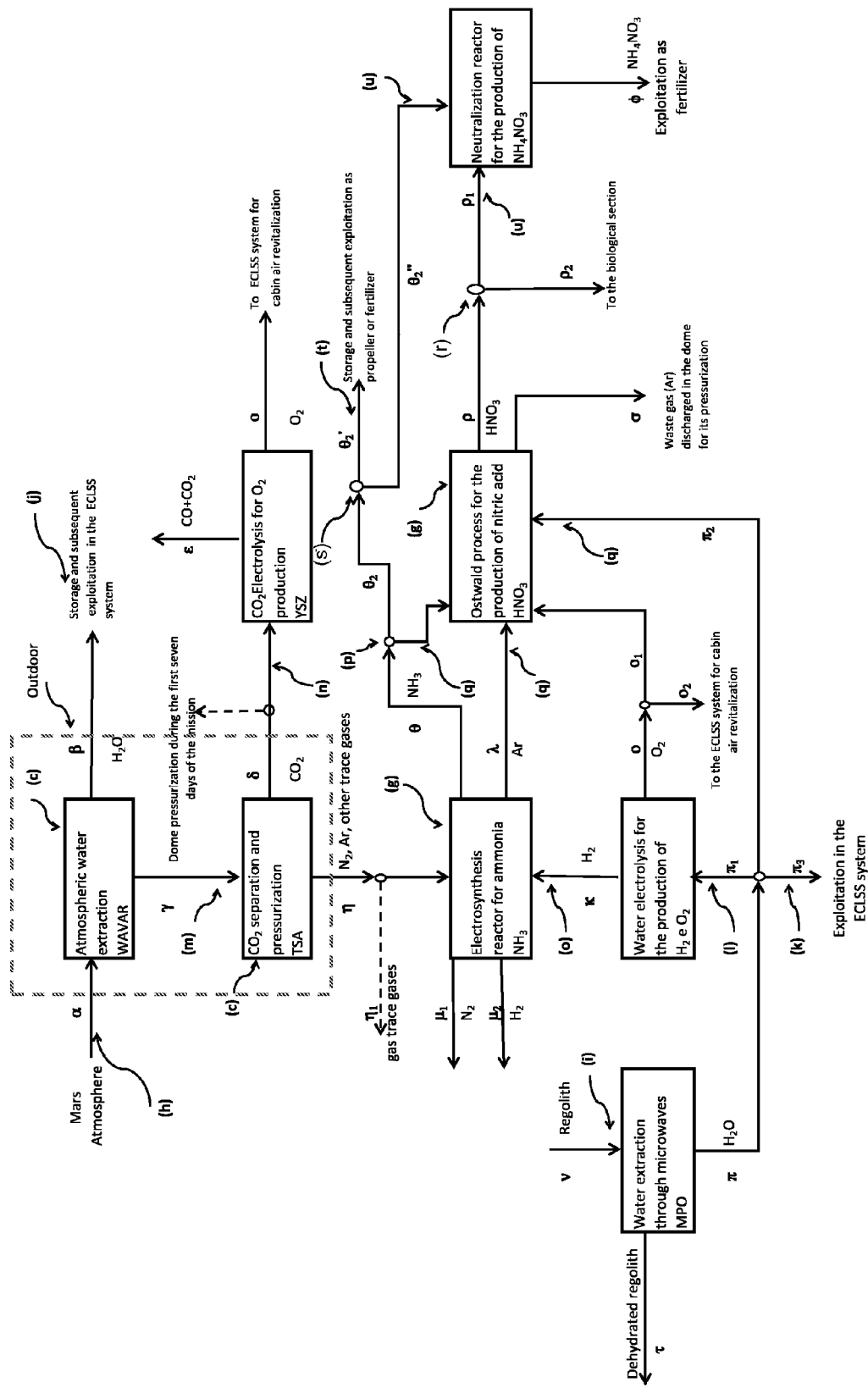
FIG. 1 shows a flow-sheet of the "chemical physical" section is shown according to the Example of the present invention.

The present invention concerns a process, as well as a kit of materials and apparatus for the production of oxygen, water, carbon monoxide, ammonia, nitrogen fertilizer, edible biomass and food, starting from Martian resources for the sustainment of medium/long term manned space missions to Mars.

The process and the kit related to the present invention, have to be understood as a system which operates in synergy with ECLSS systems, thus representing its ideal completion with the aim to achieve a self-sustaining integrated system.

Therefore, the process is based upon the use of Martian resources such as the atmosphere, the soil and solar radiation, whose main features are reported in specific publications, among which for example: Moroz, V. I., "Chemical composition of the Atmosphere of Mars", Advances in Space Research, 22, 449-457 (1998); and J. F. Bell III, et al. "Mineralogic And Compositional Properties Of Martian Soil And Dust: Results From Mars Pathfinder" J. Geophys. Res., 105, 1721-1755, (2000). In particular, relatively high amounts (about 9% wt/wt) of hydration water has been detected in the Martian soil (Rieder, R., et al. "Chemistry of Rocks and Soils at Meridiani Planum from the Alpha Particle X-ray Spectrometer" Science 306, 1746-1749 (2004)).

Therefore, the invention concerns a process which comprises two different sections i.e. the "chemical physical section" where oxygen, water, carbon monoxide, ammonia, nitrogen fertilizers are produced; and the "biological section" where edible biomass is produced, said "chemical-physical section" comprising the steps of:

a) assembling on the Martian surface at least one geodesic dome to house the plant units operating indoor;
b) assembling outdoor photovoltaic panels to produce energy needed for heating inside the at least one dome and for powering plant of said plant units;
c) assembling outdoor a variable-temperature adsorption unit (Temperature Swing Adsorber or TSA) and a solid-state dehumidifier (Water Vapor Adsorption Reactor or WAVAR);
d) blowing pressurized Martian $CO_2$ into said at least one dome, through TSA, until an internal pressure not less than 0.8 bar is achieved;
e) heating the interior of said at least one dome until a temperature not less than 10° C. is achieved, through heating systems powered by said photovoltaic panels;
f) assembling a structure for the mechanical protection of plant units operating outdoor;
g) placing inside the at least one dome the plant units for the production of fertilizers;
h) conveying the gas consisting of Martian atmosphere to the WAVAR unit, which operates outdoor, for the atmospheric water extraction;
i) excavating and conveying the Martian regolith to an indoor system named MPO (Microwave Oven Pizza), for the extraction of adsorbed water and minerals' hydration water, by microwaves;
j) conveying the water extracted from Martian atmosphere to a storage tank;
k) splitting the water extracted from the regolith in three streams named $\pi1$, $\pi2$ and $\pi3$;
l) conveying the water stream $\pi1$ to an electrolyzer operating indoor to produce two distinct streams of $H_2$ and $O_2$;
m) conveying the dehydrated atmosphere outcoming from the unit WAVAR to the system TSA of separation and pressurization of $CO_2$, based on cycles of adsorption-desorption at variable temperatures on zeolitic materials, simultaneously producing a second gas stream which essentially consists of $N_2$ and Ar;
n) conveying the separated and pressurized $CO_2$ to an electrolyser for the production of $O_2$ and a gas stream consisting of a mixture of CO and $CO_2$ to be stored and used as a propellant for extravehicular activity;
o) conveying the second stream separated from the TSA, which essentially consists of $N_2$ and Ar, together with $H_2$ produced by electrolysis of water, into a reactor that allows the production, by electrosynthesis, of gaseous ammonia ($NH_3$), simultaneously producing a stream of Ar which is inert during the reactive process leading to the production of $NH_3$;
p) splitting the stream of produced $NH_3$ in two streams named $\theta1$ and $\theta2$;
q) conveying the stream of Ar coming from the electrosynthesis step (o), together with the stream $\theta1$ of $NH_3$ (p), with the oxygen, produced as per step (l), with the stream of water $\pi2$ produced as per step (k), to a unit for the production of nitric acid ($HNO_3$) and an exhaust gas mainly consisting of Ar, which operates on the basis of the Ostwald process;
r) splitting the stream of the produced $HNO_3$ in two streams named $\rho1$ and $\rho2$;
s) further splitting the stream $\theta2$ of $NH_3$ produced as per step (p) in two streams named $\theta2'$ e $\theta2''$;
t) conveying the stream $\theta2'$ to a storage tank from which drawing the $NH_3$ to be used as a propellant for extravehicular activity or as a fertilizer in hydroponics;
u) conveying the stream $\rho1$ of $HNO_3$ together with the stream $\theta2''$ of $NH_3$, produced as per step (s) in a reactor for the absorption and neutralization, which allows the production of ammonium nitrate ($NH_4NO_3$) to be used as fertilizer; and said biological section comprising the steps of:

a') assembling on the Martian surface at least one geodesic dome to house the plant units operating indoor;
b') assembling outdoor photovoltaic panels to produce energy needed for heating inside the at least one dome and for powering plant of said plant units;
c') assembling outdoor a variable-temperature adsorption unit (Temperature Swing Adsorber or TSA) and a solid-state dehumidifier (Water Vapor Adsorption Reactor or WAVAR);
d') blowing pressurized Martian $CO_2$ into said at least one dome, through TSA, until an internal pressure not less than 0.8 bar is achieved;
e') heating the interior of said at least one dome until a temperature not less than 10° C. is achieved, through heating systems powered by said photovoltaic panels;
f') excavating and conveying the Martian regolith to an indoor system named MPO (Microwave Oven Pizza), for the extraction of adsorbed water and minerals' hydration water, by microwaves;
g') mixing the water produced with suitable amounts of nitric acid produced in said chemical-physical section;
h') splitting the dehydrated regolith produced as per step (f') into two distinct solid streams named $\tau_1'$ and $\tau_2'$;
l') conveying the water mixed with nitric acid produced in step (g') together with the solid stream $\tau_1'$ of regolith in a leaching reactor for the transfer of micro- and macro-nutrients from the solid phase to the liquid phase;
j') conveying the mixture of solid and liquid (slurry) coming from the leaching reactor to a filtration system for the separation of the solid, named "leached regolith" from the liquid enriched in micro- and macronutrients, named "culture broth";
k') conveying the Martian atmosphere to the unit TSA of separation and pressurization of $CO_2$, based on cycles of adsorption-desorption at variable temperatures on zeolitic materials, simultaneously producing a second gas stream which essentially consists of $N_2$ and Ar;
l') storing said second gas stream of $N_2$ and Ar, produced as per step (k'), in suitable containers from which it can be drawn to be used as a buffer gas in analytical apparatus used during sampling steps to be carried out for scientific purposes during mission;
m') preparing an inoculum of suitable algal strains brought from Earth;
n') conveying the "culture broth" produced as per step (j'), together with the pressurized stream of $CO_2$, produced as per step (k'), together with $HNO_3$, produced in said chemical-physical section, and the inoculum produced as per step (m'), in at least one photobioreactor to be used to promote algal growth;
o') performing the $CO_2$ absorption in liquid phase through systems based on hydropneumatic pumps ("airlift") that allow proper mixing of components conveyed in the photobioreactor, and adequate circulation of the mixture of algae and culture medium, named "biological slurry";

p') exposing the at least one photobioreactor to a light source capable of promoting photosynthesis, thus resulting in the formation of new photosynthetic algae biomass and oxygen;

q') separating the algal biomass from the culture broth by centrifugation and oxygen by degassing;

r') storing oxygen to be conveyed to ECLSS sections (Environmental Control and Life Support System) in a sealed and pressurized tank, and further dehydrating algal biomass in order to use it as food or dietary supplement;

s') transferring the culture broth spent in step q'), together with ammonium nitrate ($NH_4NO_3$) produced in the chemical-physical section, the leached regolith, produced as per step (j'), with appropriate amounts of humic and fulvic acids brought from Earth, and human metabolic wastes, into the domes where plantations for food are grown.

Therefore, the process of the present invention involves a first step a) where, the domes within which the plant units operating indoor that are needed for implementing the process are installed and assembled. Inside the domes, by means of techniques better specified in what follows, thermo-baric conditions (temperature and pressure) are set at which the state of aggregation of reactants and products is completely analogous to the one observed on earth for the same compounds.

The step (b) involves the installation and the deployment of a photovoltaic system which produces the energy needed to power the whole process.

The step (c) involves the outdoor assembling of at least one temperature swing adsorber (TSA) and, at least one solid state dehumidifier (WAter Vapor Adsorption Reactor or WAVAR).

In particular the unit for the extraction of the atmospheric water of Mars (WAVAR), and the unit for the separation and pressurization of atmospheric $CO_2$ through cycles of adsorption-desorption at oscillating temperature (TSA), will operate outdoor. These units, while operating under thermo-baric conditions of Mars, will be mechanically protected by suitable structures from potential damage provoked by hits of meteorites and/or solids transported during the usual dust storms that characterize the Martian environment. Such structures may be built in situ through specific technologies such as, for example, the technology proposed by the international patent (WO 2012/014174 A2)

The step (d) involves the forced blowing of pressurized Martian $CO_2$ inside the domes, by means of TSA units, until an internal pressure of at least 0.8 bar is reached.

The step (e) of the process involves the increase of temperature inside the domes up to at least 10° C. but preferably between 10 and 15° C.

The step (f) is related to the construction of structure for mechanical protection of equipment that operate outdoor.

The step (g) involves the housing inside the dome of the plant units that will be used for producing fertilizers. Once all units have been installed, both inside and outside the dome, the step (h) of the process involves the conveyance of the martian atmosphere to the at least one WAVAR unit.

Simultaneously with the step (h), the step (i) of the process is carried out. The latter one involves the excavation and transportation of Martian regolith to a system called MPO (Microwave Pizza Oven), which operates indoor and allows the extraction of adsorbed and hydration water from minerals, by means of microwaves. Water vapor obtained during the above steps can be condensed and subsequently stored, as provided by step (j), in a buffer tank from which it can be withdrawn, in suitable amounts, for being used in the following steps of the process. The dehydrated regolith is then removed from the structure housing the MPO system through a system of conveyor belts.

The step (k) involves the withdrawn of a water stream from the buffer tank and its splitting into three different streams referred as $\pi_1$, $\pi_2$ e $\pi_3$ by means of suitable pipe fittings.

As shown in step (l) the stream $\pi 1$ is conveyed to an electrolyser, where, by exploiting the electricity supplied by the photovoltaic system, the electrolysis of water and the consequent production of hydrogen ($H_2$) and oxygen ($O_2$) is performed.

According to a preferred embodiment, the electrolysis of water takes place within an electrolytic cell equipped with electrodes (cathode and anode) and an electrolyte for allowing the passage of ions, electrically powered with direct current.

The step (m) of the process involves the conveyance of the Martian dehydrated atmosphere, produced as shown in step (h), to a system for the separation of $CO_2$ from the other gases present and its contextual pressurization. Preferably, such step is carried out by means of a process called Temperature Swing Adsorption (Rapp, D., et al. "Adsorption Compressor for Acquisition and Compression of Atmospheric $CO_2$ on Mars", 33rd AIAA/ASME/SAE/ASEE, Joint Propulsion Conference and Exhibit, (1997)).

By using the TSA units a stream of pure $CO_2$ characterized by a pressure of 0.8 bar is produced. Such a unit, simultaneously produces a secondary gas stream, consisting mainly of $N_2$ and Ar, which will be used in subsequent steps of the process. The so obtained pure $CO_2$ stream at 0.8 bar, is then used for pressurizing the inner of the domes and/or for feeding the electrolyzer from which CO and $O_2$ are obtained. The oxygen produced, characterized by a temperature of 800° C. and a pressure of 0.8 bar, is then stored in suitable tanks from which it can be withdrawn to be fed to the ECLSS system.

The carbon monoxide can be stored in suitable tanks from which it can be withdrawn to be used as propellant for the Rovers and/or other equipment useful to carry out extra-vehicular activities, as shown in step (n).

Step (o) of the process involves the feeding of the secondary stream produced by the TSA unit, which consists primarily of $N_2$ and Ar, together with $H_2$ produced through electrolysis of water, to a reactor that produces, trough electrosynthesis, gaseous ammonia ($NH_3$) as well as a stream of Ar which remains inert during the reactive steps that lead to the production of $NH_3$. Said electrosynthesis of ammonia can be advantageously carried out according to the process proposed by Rui-Quan; L., et al. "Synthesis of ammonia at atmospheric pressure with Ce0.8M0.2$O_{2-\delta}$ (M=La, Y, Gd, Sm) and their proton conduction at intermediate temperature" Solid State Ionics 177 (2006) 73-76, that for the purposes of the present invention involves the use of argon instead of air. Therefore ammonia characterized by a temperature of 650° C. and a pressure of 0.8-1 bar, is obtained. Since $NH_3$ produced during step (o) is characterized by a good calorific value (about 14360 kJ/m3), a specific aliquot can be used as propellant/fuel to be exploited during the extra vehicular activity. Moreover, since $NH_3$ is also characterized by a high thermal conductivity (about 245.6 mw/cm·K) a further aliquot of the ammonia produced can be used as heat transfer fluid in the heat exchangers employed in the system ECLSS. Simultaneously to the $NH_3$, during the step (o) a stream of argon, which will be used for producing nitric acid as shown in the following step (q), is obtained.

The step (p) of the process involves that the stream of ammonia produced during step (o) is splitted, by means of T-connectors into two separate streams, namely $\theta 1$ e $\theta 2$.

Step (q) of the process involves the feeding of the stream of outgoing Ar from the electrosynthesis section (o), together with the stream θ1 of ammonia (o) and the stream of oxygen produced as shown in step (l) as well as the stream π2 of water produced in step (k), to the unit which operates on the basis of the process Ostwald (Ostwald, W., "Process of manufacturing nitric acid" U.S. Pat. No. 858,904 (1907)). Unlike the original process by Ostwald, Ar is involved by the present invention instead of excess air to reduce the exothermicity of the reaction which allows to obtain nitric acid and argon as shown in step (q).

Step (r) involves the splitting of the stream of nitric acid into two separate currents, referred as ρ1 and ρ2. As better specified in what follows, the stream ρ1 is then used as a source of macronutrient within photobioreactors, while the stream ρ2 is fed to the absorption/neutralization reactor where ammonium nitrate ($NH_4NO_3$) is produced.

During step (s), which is carried out simultaneously to step (r), ammonia stream θ2 is further splitted into two streams named θ2' and θ2". The latter one is stored in suitable tanks and then used as a fuel, as indicated by step (t), while the stream θ2' is fed to the neutralization reactor from which ammonium nitrate is obtained according to step (u).

As far as the "biological section", the steps from (a') to (f') are completely analogous to the corresponding ones already described for the chemical-physical section.

Step (g') involves the mixing of the water extracted from regolith with suitable quantities of nitric acid produced in the chemical-physical section. Such operation allows the lowering of water pH thus enhancing mass transfer of macro and micro nutrient from the regolith to the liquid phase in the following step (i') which is related to the leaching processes.

In step (h') the solid stream of dehydrated regolith produced during step (f') is suitably splitted into two streams named τ1' and τ2', respectively. The solid stream τ2' can be then used as feedstock for building specific structures for protecting the units which operate "outdoor". The process for producing the building material can be based on the technology proposed by the Italian patent application n. MI2010A001412.

The solid stream τ1' must be high enough to ensure a weight ratio of 1:5 wt/wt with the stream of water and nitric acid produced in step (g').

Step (i') involves the feeding of solid stream flow τ1' together with stream of nitric acid, together with the water stream into a reactor where liquid and solid are contacted in order to form a slurry which is continuously stirred thus allowing an effective contact between liquid and solid phase. The goal of such step is to transfer all macronutrients (P, S, C) and micronutrients (Fe, Mg, Si, etc.) contained by the regolith, to the liquid phase. This way, a "culture broth" is produced which, once integrated with nitrogen-based nutrients, will be able to sustain autotrophic algal growth phenomena as described by in Olsson-Francis, K. Et al. "Use of cyanobacteria for in-situ resource use in space applications" Planetary and Space Science 58 1279-1285 (2010). The suitable contact time to ensure an effective mass transfer of nutrients into the liquid phase is about 24 hours.

Step (j') of the process involves the solid/liquid separation which can be carried out by means of suitable filtrating systems (i.e. filter plates or filter bags).

Therefore the operating step (j') generates two separated streams, the first one is the leached regolith while the second one is a liquid that, once mixed with the nitric acid produced in the chemical physical section, will provide the "culture broth" for microalgae.

Simultaneously with the above mentioned steps, $CO_2$ for Mars atmosphere is first separated and then pressurized by using TSA systems. In fact $CO_2$ represents another crucial macronutrient for sustaining algal growth.

Step (m'), which is performed "una tantum", involves the preparation of the inoculus which will be fed in the photobioreactor for its start-up. Preferably, the inoculus will consist of the following algal strains: *Gloeocapsa* strain OU_20, *Leptolyngbya* strain OU_13, *Phormidium* strain OU_10, *Chroococcidiopsis* 029; *Arthrospira platensis*; *Synechococcus elongatus*; *Anabaena cilindrica*; *Chlorella vulgaris*; *Nannochloris Eucaryotum* or genetically engineered strains.

The step (n') involves the feeding of the inoculum in a photobioreactor where are the following streams are simultaneously fed: the liquid stream outgoing from the leaching produced in step (j'), the gaseous $CO_2$ obtained in step (k') and a suitable amount of nitric acid obtained in the chemical-physical section.

During step (o'), preferably, $CO_2$ is bubbled into the liquid by means of airlift-type hydropneumatic pumps which assure a suitable liquid circulation within the photobotobioreactor. Moreover, suitable diffusers are preferably used in order to inject $CO_2$ in the form of fine bubbles. On the other hand, nitric acid is simply injected into the culture broth thus allowing its enrichment with nitrates.

Once the above mentioned compounds are mixed with the algal inoculus, an algal culture, hereafter named "biological slurry" is obtained. Such "biological slurry" if exposed to a suitable light flux, is able to trigger and sustain photosynthetic phenomena that in turn allow the production of algal biomass which can be used as feedstock for food. Light flux can be supplied by directly exposing the culture to the solar radiation incident on Martian surface or, preferably, by means of suitable systems such as light concentrators and optical fibers.

Therefore the photosynthetic process leads to the production of new microalgae which results in the increase of algal biomass concentration in the culture.

According to a preferred embodiment, photobioreactors operate in fed-batch mode, i.e. in semi-continuous mode. Therefore, algae cultivation is carried in closed system where the biological slurry is entirely recirculated until biomass concentration reaches suitable values which correspond to the stationary phase of the growth kinetics of algae.

Once the stationary phase is reached, a suitable amount of "biological slurry" is withdrawn and undergone to dehydration processes for separating the biomass from the spent "culture broth". The amount of biological slurry that was withdrawn from the photobioreactor is then replaced by an equal amount of fresh "culture broth" (without microalgae and produced as shown in step (j')) which re-supplies the nutrients consumed during algae growth.

Once the operating steps of withdrawal and reintegration of fresh "culture broth" are performed, micro-algae growth is restarted again in batch mode. The operations of removing and re-integrating should be repeated periodically, preferably once for day, at the same hour of the day, in order to ensure at least 25 hours (duration of the Martian day) of growth in batch mode.

The step (q') of the process involves the transfer of the "biological slurry" extracted daily, to a step of solid-liquid separation that is carried out by means of suitable centrifugation systems. The solid-liquid separation performed in this step allows separating the algal biomass from the spent "culture broth".

The latter one can be recirculated to the head of "biological section" in order to reduce the inlet amounts of water needed, and thus the amount of water to be extracted from regolith. On the other hand, according to a preferred embodiment, the spent culture broth can be used for irrigating the greenhouses or the hydroponics systems where vegetables are cultivated.

The solid algal biomass separated by centrifuges, can be further dehydrated by means of microwave ovens and then used as food by astronauts.

In step (q'), oxygen produced by photosynthesis is separated from biological slurry through suitable degassing systems and then transferred to the ECLSS units where it can be used for the crew cabin air revitalization. Therefore the step (r') of the proposed process involves the storage of the oxygen produced by photosynthesis in suitable pressurized tanks.

The step (s') involves the transfer of the different products of the processes so far described within a dome which operate as greenhouse where you plants and vegetables can be cultivated. Preferably, the step (s') comprises the following sub-steps:

s'1) recreating inside the dome to be used as a greenhouse on Mars, the conditions of temperature and pressure compatible with the growth of desired plant species;

s'2) conveying the leached regolith produced as per step (j') to the dome, which functions as a greenhouse;

s'3) mixing the regolith of the sub-phase (s'2) with ammonium nitrate ($NH_4NO_3$) produced in step (u) of the chemical-physical section to ensure a proper intake of nitrogen-based nutrients in the regolith;

s'4) mixing the regolith and the ammonium nitrate with suitable amounts of humic and fulvic acids;

s'5) mixing with the regolith suitable amounts of organic waste coming from houses of the astronauts to increase the soil organic matter content;

s'6) proceeding with the planting of plant species;

s'7) irrigating the crop by using the spent solution coming from the centrifuges; and s'8) providing the light flow needed for photosynthesis.

In another aspect, the present invention concerns a kit of materials and apparatus for the implementation of the process of the invention, comprising two groups of parts, named "chemical physical" group and "biological" group. The "chemical physical" group of the kit comprises:

at least one geodesic dome to house the various units used in the chemical-physical section of the process;

at least one photovoltaic panel for producing the energy for heating the atmosphere inside the at least one dome and for functioning the plant units specified below;

at least one unit TSA consisting of at least one adsorbent bed of zeolite and at least one radiator having the function to ensure the heat exchange with the natural environment of Mars to allow the execution of adsorption-desorption cycles at variable temperature, for separating $CO_2$ from other constituents of the Martian atmosphere gases (mainly $N_2$ and Ar), and pressurizing the separated $CO_2$, as well as blowing and put the same pressure of $CO_2$ into the at least one dome;

at least one unit WAVAR based on the use of zeolites and adsorption process, followed by desorption with microwaves, for the extraction of water present in the Martian atmosphere;

at least one storage tank for water extracted from the atmosphere of Mars;

at least one excavator and at least one conveyor belt for the excavation and conveyance of the Martian regolith to the unit for processing the same;

at least one unit MPO, including at least one magnetron for the extraction of water adsorbed and hydration from the Martian regolith by using microwave heating;

at least one pipe connector having three outputs for splitting the water extracted from the regolith in three streams named $\pi 1$, $\pi 2$ and $\pi 3$;

at least one electrolyzer for electrolysis of water of the stream $\pi 1$, and the production of hydrogen and oxygen;

at least one electrolyzer for electrolysis of $CO_2$ and obtaining separated oxygen and a mixture of CO and $CO_2$;

at least one unit consisting of at least one electrosynthesis reactor with solid electrolyte (Solid oxide fuel cell) for the production of ammonia from gas with a high content of $N_2$ and Ar produced into the unit TSA and hydrogen obtained by electrolysis of water;

at least one unit consisting of a connector "T" for splitting the stream of produced ammonia in two streams, named $\theta 1$ and $\theta 2$;

at least one unit for the production of nitric acid ($HNO_3$) by Ostwald process from Ar, $NH_3$, $H_2O$, $O_2$, said unit comprising at least one catalytic reactor, at least one absorption tower and at least one system for stripping "NOx";

at least one unit consisting of a connector "T" for splitting the stream of produced nitric acid ($HNO_3$) in two streams, named $\rho 1$ and $\rho 2$;

at least one unit consisting of a connector "T" for splitting the stream $\theta 2$ into further two streams named $\theta 2'$ and $\theta 2''$;

at least one storage tank for the $NH_3$ produced; and at least one gas-liquid reactor operating continuously for the production of $NH_3$ and $NH_4NO_3$ from $HNO_3$.

Said "biological" group of the kit comprises:

at least one geodesic dome to house the various units used in the biological section of the process;

at least one photovoltaic panel for producing the energy for heating the atmosphere inside the at least one dome and for functioning the plant units specified below;

at least one unit TSA consisting of at least one adsorbent bed of zeolite and at least one radiator having the function to ensure the heat exchange with the natural environment of Mars to allow the execution of adsorption-desorption cycles at variable temperature, for separating $CO_2$ from other constituents of the Martian atmosphere gases (mainly $N_2$ and Ar), and pressurizing the separated $CO_2$, as well as blowing and put the same pressure of $CO_2$ into the at least one dome;

at least one excavator and at least one conveyor belt for the excavation and conveyance of the Martian regolith to the unit for processing the same;

at least one unit MPO, including at least one magnetron for the extraction of water adsorbed and hydration from the Martian regolith by using microwave heating;

at least one unit for mixing the water extracted from the regolith with suitable amounts of nitric acid produced in the chemical-physical section;

at least one unit consisting of a two-way conveyor belt for splitting the regolith dehydrated in two solid streams named $\tau_1'$ and $\tau_2'$;

at least one reactor operating continuously for leaching of solid stream $\tau_1'$ of regolith with a mixture of water and nitric acid;

at least one unit consisting of a "plate filter" for the solid/liquid separation to be performed on the slurry outing the leaching reactor and the simultaneous production of "culture broth" and a stream of "leached regolith";

at least one tank for storing $N_2$ and Ar-based gas obtained by the previous unit as a result of separation from $CO_2$;

at least one of the following algal strains: *Gloeocapsa* strain OU_20, *Leptolyngbya* OU_13 strain, *Phormidium* strain OU_10, *Chroococcidiopsis* 029;

*Arthrospira platensis, Synechococcus elongatus, Anabaena cylindrical; Chlorella vulgaris; Nannochloris Eucaryotum* or genetically modified strains;

at least one unit for the preparation of the inoculum of algal strains;

at least one photobioreactor for the production of algal biomass, wherein the culture broth contacts the algal inoculum, with nitric acid and the gas stream having a high content of $CO_2$ named $\theta 2$;

at least one hydropneumatic pump type "airlifit" for the absorption of $CO_2$ in the liquid phase, the proper degree of mixing between components conveyed in the photobioreactor and the circulation of the "biological slurry";

at least one unit for the separation of algal biomass and oxygen produced in the photobioreactor from the spent culture broth;

at least one tank for storing oxygen produced by the photobioreactor;

at least one unit for the dehydration of algal biomass, and at least one geodesic dome to be used as a greenhouse for growing edible plants.

As far the "chemical-physical" group of the kit is concerned, within the at least one geodesic dome, the different plant units of physical chemical section that must operate at temperatures of at least 10° C. and pressures of at least 0.8 bar, are housed. Preferably the domes are made by a framework of aluminum beams with a circular section. Preferably, the coverage of the geodesic dome is made by sheets of ETFE (Ethylene Tetrafluoroethylene) having a surface density of 0.2 kg/m2 as well as an high mechanical and thermal resistance.

Preferably, the at least one photovoltaic system produces the energy that is needed to power all the operating steps of the invented process, including the step of heating the inner atmosphere of the domes. Under the electrical point of view, said photovoltaic system is preferably divided into separate sections (arrays), each of them having a surface of about 40 $m^2$, as well as a yield of converting solar radiation into electricity that is about 11%.

The use of temperature swing adsorption, which uses adsorption/desorption cycle at variable temperature on zeolites, is proposed for separation, blowing and compression of $CO_2$ within the domes according to the principles previously described for TSA units. A suitable unit for the extraction of water form Mars atmosphere could be the one described by Williams, J. D., et al. "Design of a water vapor adsorption reactor for Martian In Situ Resource Utilization" Journal of British Interplanetary Society, 48, 347-354 (1995).

The at least one excavator and at least one belt conveyor are used to excavate and transport the Martian regolith to the treatment units and in particular to the water extraction system namely the MPO units. As far the excavator is concerned, a suitable typology can be that one described by Caruso, J. J. et al., "Cratos: A Simple Low Power Excavation and Hauling System for Lunar Oxygen Production and General Excavation Tasks" (2008), which consists of a vehicle powered by photovoltaically rechargeable batteries or independently by means of small photovoltaic systems housed on the same vehicle.

The closed belt conveyors will transfer the regolith to the microwave heating system where adsorbed and hydration water will be extracted from the minerals of the regolith. Hence conveyor belt will convey the regolith within the at leas MPO unit for water extraction. The extracted water will be the splitted into three separated streams named $\pi 1$, $\pi 2$ e $\pi 3$ by means of a four way pipe fitting.

The water stream $\pi 1$ is then transferred to the electrolysis unit which consists of a solid electrolyte for proton exchange, a cathode and an anode both made of porous material onto which a catalyst is disposed that assures a good yield even if operating at low temperatures.

In parallel with these operations, $CO_2$ separation and pressurization is carried out starting from the Martian dehydrated atmosphere outgoing from the WAVAR unit.

Such an operation is performed through the at least one unit for the adsorption/desorption of $CO_2$ at variable temperature during the step (m) of the process.

The pure and pressurized $CO_2$ is used to produce $O_2$ and CO by means the at least one unit for $CO_2$ electrolysis provided by the present invention. To this aim, the use of at least one electrolyzer is provided which consists of a solid electrolyte, a cathode and an anode both made of porous material onto which a catalyst is disposed that assures a good yield even if operating at low temperatures.

The at least one cell for the electrosynthesis of ammonia consists of a solid oxide electrolyte for the exchange of ions, a cathode and an anode both made of porous material onto which a catalyst is disposed that assures a good yield even if operating at low temperatures It should be specified that $N_2$ and Ar are both fed to the electrosynthesis cell.

However, while nitrogen participates in the reactions related to the phase (o), argon remains substantially inert. For this reason, the output from this unit will consists of a stream of ammonia and a stream of argon. The latter one can be suitably exploited as diluent in the section where nitric acid is produced through ammonia combustion. The produced stream of ammonia is instead splitted into two separate streams named $\theta 1$ and $\theta 2$ by means of suitable T-type pipe connectors.

The step (q) of the process involves the transfer of the ammonia stream $\theta 1$, together with the entire stream of argon and the oxygen produced in step (l) as well as the water stream $\pi 2$ obtained in step (k) to the unit which operates on the basis of the Ostwald process for producing nitric acid. Such a process is based-on the operations described for at step (q) and exploits a catalytic reactor where ammonia combustion is carried out, an absorption tower where $HNO_3$ is produced starting from $N_2O_4$ as well as a system where NO is tripped and the acid is concentrated. Therefore, the modified Ostwald process, which is self-sustaining from the energy point of view, produces nitric acid, which is used for the subsequent steps of the process, and a gas stream consisting mainly of Argon. The nitric acid can be used both as a source of nitrates to ensure algal growth in photobioreactors and for producing ammonium nitrate to be used as a fertilizer for the cultivation of edible plant species (vegetables). To this aim the stream of nitric acid produced is suitably splitted into two separate streams named $\rho 1$ and $\rho 2$ by means of suitable T-type pipe connectors. By exploiting similar pipe connectors, the stream $\theta 2$ of ammonia produced in the step (p) of the process is further splitted into two separate streams named $\theta 2'$ e $\theta 2''$.

The step (u) of the present process involves the feeding of the nitric acid stream $\rho 1$, together with the ammonia stream $\theta 2''$ in a reactor for the production of ammonium nitrate. The at least one reactor for the production of ammonium nitrate must be gas-liquid type. By operating the reactor, crystalline ammonium nitrate can be produced in form of white powder which can be used as fertilizer.

As far the "biological" group of the kit is concerned, preferably, the at least one slurry reactor should be agitated and coated with coated with anti acid paint. Preferably the reactor size must be such to provide a residence time of at least 24 hours. The slurry outgoing from the reactor is transferred to step (j') where the solid/liquid separation takes place. To this aim the process of the present invention involves the use of at least one filter for separating the solid phase of the slurry from the liquid one.

The units for performing the adsorption-desorption cycles at variable temperatures are analogous, in terms structural and functional characteristics, to those ones used in the chemical physical section.

Different typologies of photobioreactors may be employed, but tubular ones with tubes arranged in such a way to form an helicoid (known as BIOCOILs), should be preferred. Tubes should be made of PET (polyethylene terephthalate) since they must be transparent with respect to the photosynthetically active radiation. Preferably tubes must be less than 0.2 m in diameter. Probably photobioreactor should be operated in fed-batch mode with total recirculation. Advantageously, in order to avoid damage and inhibition of algal cells, the oxygen 25 level should not preferably exceed about 400% of air saturation value. Since the oxygen produced by photosynthesis cannot be removed within the photobioreactor's tubes, advantageously algal culture is periodically sent to a degassing device in order to strip dissolved oxygen of the algal culture. The oxygen extracted can be thus transferred to the ECLSS section where the crew cabin air revitalization is carried out. $CO_2$ could be injected in suitable points placed at specific intervals along the tubes. This allows to advantageously prevent algae starving due to carbon dioxide consumption and too high value of pH.

Light flux, necessary to promote photosynthesis, can be supplied through direct exposition the photobioreactor to the solar radiation incident on Martian surface or, preferably, by means of suitable light collecting systems such as light concentrators and optical fibers which transfer the light to the domes where photobioreactors are housed.

According to a fed-batch operating mode of the photobioreactor, a suitable amount of "biological slurry" is withdrawn and replaced by an equal amount of fresh "culture broth" obtained as shown in step (j'). The amount of "biological slurry" that is withdrawn is then undergone to a solid/liquid separation. Preferably the units for separating algal biomass from spent "culture broth" is carried out by means at least one centrifuge.

The algal biomass produced can be further dehydrated by means of suitable microwave ovens to be then used as food by astronauts.

The spent "culture broth" outgoing from the centrifuge, being characterized by residual concentrations of nutrients (also nitrogen-based nutrients), can be used for the irrigation of the already fertilized Martian soil for cultivating vegetables in Martian greenhouses.

Working example of the present invention is herein below provided for illustrative and non limiting purposes.

EXAMPLE

Implementing and Working Scheme of the Plant for the Production of Useful Materials for the Sustainment of Manned Space Missions in Martian Soil Through the Use of in situ Available Resources According to the Present Invention First the physiological wellness of the crew exploring the planet Mars is taken into account. To this aim the minimum amounts of water, oxygen and food reported in Table 1 should be provided daily per/astronaut.

TABLE 1

| Compound | Minimum amount required kg/day/astronaut |
| --- | --- |
| Oxygen | 0.84 |
| Food (dehydrated) | 0.62 |
| Water (drinking) | 3.91 |
| Water (hygenic) | 25.58 |

In this example, a plant which includes equipment and materials of the kit of the invention, is designed for implementing the process of the invention which involves the production of useful materials to sustain manned space missions in martian soil through the exploitation of in situ available resources. Also the operating parameters were designed according the process of the invention.

Design of the Plant of the "Chemical Physical" Section

As far the chemical-physical section is concerned, first a mass flow rate ($\alpha$) of about 121.547 kg/h of Martian atmosphere is dehydrated through the WAVAR unit according to the step (h) of the process. A mass flow rate ($\beta$) of water equal to about 0.02297 kg/h and a mass flow rate ($\gamma$) of dehydrated martian atmosphere equal to about 121.5442 kg/h are produced at the outlet of the WAVAR unit.

All the mass flows above are characterized by a pressure of 8 mbar and a temperature of 210 K. To the aim of planning the mission on Mars, Table 2 shows the relevant size features of the WAVAR unit.

TABLE 2

| Plant unit | Unit of measure | Value |
| --- | --- | --- |
| Unit name | — | WAVAR |
| N° of units | — | 1 |
| Payload | kg | 21.71 |
| Power consumption | kW | 0.196 |
| Footprint surface | m$^2$ | 1.927 |
| Footprint volume | m$^3$ | 1.927 |
| Height (max) | m | 1 |
| Operation time | hours/day | 12 |
| Operation mode | — | Continuous |

The mass flow rate ($\gamma$) of dehydrated atmosphere is then fed to the TSA unit $CO_2$ is first separated and then pressurized according to step (o) of the process.

A mass flow ($\delta$) of about 17.225 kg/h of pure $CO_2$ having a pressure of 0.8 bar and a temperature of 450° K, is produced at the outlet of the TSA unit. Simultaneously a mass flow rate ($\eta$) of about 4.318 kg/h, of a gas consisting mainly of $N_2$ and Ar and characterized by a pressure of 8 mbar and a temperature of 210° K, is produced at the outlet of the TSA unit. In order to assure such performances at least 11 TSA units having the features shown in Table 3 should be used.

TABLE 3

| Feature of the TSA unit | Value | Unit of measure |
| --- | --- | --- |
| Zeolite type | 13X | — |
| Volume of zeolite needed | 2.08 | m$^3$ |
| Length of the zeolite bed | 2.99 | m |
| Diameter of the zeolite bed | 0.83 | m |
| L/D ratio | 3.6 | — |
| Height of the unit | 1.64 | m |
| Irradiation surface for heat exchange | 67.44 | m$^2$ |
| Head loss | 4 | torr/g$_{CO2}$/sec |
| Area of the filter used for removing powder | 0.16 | m$^2$ |
| Total power consumed for each bed | 9094.91 | W |
| Payload of each unit | 2517.77 | kg |

Therefore, the 11 TSA units, overall require the space and energy availability shown in Table 4.

TABLE 4

| Plant unit | Unit of measure | Value |
|---|---|---|
| Unit Name | — | TSA |
| N° of units | — | 11 |
| Payload | kg | 27695.55 |
| Power consumption | kW | 100.044 |
| Footprint - area | m$^2$ | 741.8451 |
| Footprint - volume | m$^3$ | 1218.61 |
| Height (max) | m | 1.642675 |
| Operation time | hours/day | 25 |
| Operation modeo | Cyclic | 12 hours adsorption/ |
|  | Continuous | 13 hours desorption |

The stream of pressurized pure $CO_2$ ($\delta$) is then fed to the electrolyzer which operates within the geodesic dome as indicated at step (n) of the process. The unit produces a mass flow rate of pure oxygen (w) equal to 38.36 kg/h and a mass flow rate (c) of a gas mixture, containing 50% v/v of CO and 50% v/v of $CO_2$, equal to 78.86 kg/h. The stream of the gaseous mixture above can be stored in suitable tanks to be then used as propeller for the extravehicular activities that will be carried out during the mission. On the other hand, the stream of $O_2$ is conveyed to the ECLSS systems where it is used for air revitalization in the crew cabin. In particular it should be observed that the mass flow rate of $O_2$ produced is equal to 460 kg/day which, on the base of the per-capita needs reported in table 1, allows to meet the needs of an high number of crew members. Alternatively, the oxygen surplus can be used as combustion air to be mixed with suitable propellants for feeding the combustion engines used during the extra-vehicular activities.

A possible further alternative is to use the $CO_2$ produced by the TSA units for pressurizing the domes during a small fraction of time of the whole mission duration.

With the aim of producing oxygen starting from $CO_2$, an electrolyzer is used. The electrolyzer consists of several "batteries" that are obtained by superimposing layers of stacks each of which consisting of several superimposed "electrolytic cells" (or "wafers").

In this example, the $CO_2$ electrolyzer consists of at least 4 batteries each of which containing only 1 stack which, in turn consist of 10 superimposed wafers having the size of 100× 100×1 cm, for a total height of the stack of 10 cm. The voltage applied to each electrolytic cell is 1.7 V while the current density is equal to 0.4 A/cm$^2$. The main characteristics of this unit are shown in Table 5.

TABLE 5

| Plant unit | Unit of measure | Value |
|---|---|---|
| Unit name | — | Elettrolizzatore $CO_2$ (YSZ) |
| N° of units | — | 1 |
| N° of batteries per unit | — | 4 |
| N° of stacks per battery | — | 1 |
| N° of wafers per stack | — | 10 |
| Payload | kg | 28706.15 |
| Power consumption | kW | 280.94 |
| Footprint - area | m$^2$ | 4.84 |
| Footprint - volume | m$^3$ | 0.96 |
| Height (max) | m | 0.20 |
| Operation time | ore/giorno | 12 |
| Operation mode | — | Continuo |

The mass flow rate of regolith (v) that is conveyed to heating through microwaves is 385.04 kg/h. The outlet form the microwave heating section consists of a mass flow rate of water ($\pi$) equal to about 7.7 kg/h and a mass flow rate of solid dehydrated regolith ($\tau$) equal to 377.34 kg/h. The features of each MPO unit reported in Table 6 are considered in order to evaluate the number MPO units needed to produce the mass flow rates above mentioned.

TABLE 6

| Feature of each MPO unit | Value | Unit of measure |
|---|---|---|
| Mass flow rate of regolith treated | 10 | kg/h |
| Mass flow rate of water extracted | 0.2 | kg/h |
| Outlet temperature of water | 500 | ° C. |
| Payload | 20 | kg |
| Power consumption | 2.4 | kW |
| Footprint - area | 0.07 | m2 |
| Height | 0.25 | m |
| Footprint - volume | 0.02 | m3 |

Hence for the treatment of the total amount of regolith above mentioned (i.e. 385.04 kg/h), about 39 MPO units are needed, thus determining the overall power consumption and the footprint sizes shown in Table 7.

TABLE 7

| Plant unit | Unit of measure | Value |
|---|---|---|
| Unit name | — | MPO |
| N° of units | — | 39 |
| Payload | kg | 780 |
| Power consumption | kW | 93.6 |
| Footprint size (area) | m$^2$ | 2.691 |
| Footprint size (volume) | m$^3$ | 0.67275 |
| Height (max) | m | 0.25 |
| Operation time | hours/day | 12 |
| Operation mode | — | Continuous |

The extracted water stream ($\pi$) is then splitted into three separated streams named $\pi_1$, $\pi_2$ e $\pi_3$, as shown in Table 8.

TABLE 8

| Unit of measure | Mass flow rate IN stream $\pi$ | Mass flow rate OUT stream $\pi_1$ | Mass flow rate OUT stream $\pi_2$ | Mass flow rate OUT stream $\pi_3$ |
|---|---|---|---|---|
| Kg/hr | 7.701 | 3.785 | 0.065 | 3.850 |

In particular, the stream $\pi 3$ is conveyed to the ECLSS systems where the drinking water needed by the crew members is produced. It should be noted that, when considering the per-capita needs reported in Table 1, the mass flow rate of drinking water produced could meet the needs of 12 crew members.

The stream $\pi 1$ is fed to the water electrolyzer where hydrogen and oxygen are produced as reported at step (l) of the process. A mass flow rate of oxygen (o) equal to 3:36 kg/h, and, a mass flow rate of hydrogen (K) equal to about 0.42 kg/h are obtained at the outlet of the electrolyzer. In order to produce such flows, the water electrolyzer consists of only one stack which, in turn, consists of 5 electrolytic cells constituted by the membrane electrode (NAFION) assembly having a thickness of 1 cm. The area of each electroltytic cell is equal to 0.22 m$^2$. The distance between the electrolytic cells is equal to 1 cm. The voltage applied to each electrolytic cell is 1.4 V while the current density is equal to 1 A/cm$^2$. The power consumed per kg of water fed to the electrolyzer is equal to 4.17 KW while the payload is equal to 11.2 kg. Table 9 summarizes all the features of the water electrolyzer that are needed for planning the mission and for achieving the above mentioned performances.

TABLE 9

| Plant unit | Unit of measure | Value |
|---|---|---|
| Unit name | — | Water Electrolyzer (WE) |
| N° of units | — | 1 |
| N° of batteries per unit | — | 1 |
| N° of stacks per battery | — | 1 |
| N° of wafers per stack | — | 5 |
| Payload | kg | 42.40 |
| Power consumption | kW | 15.78 |
| Footprint - area | m$^2$ | 0.22 |
| Footprint - volume | m$^3$ | 0.026 |
| Height (max) | m | 0.09 |
| Operation time | hours/day | 12 |
| Operation mode | — | Continuous |

The reactor for the electrosynthesis of ammonia produces a mass flow rate of $NH_3$ ($\theta$) equal to 2.145 kg/h and a mass flow rate of Ar ($\lambda$), which remains inert during reaction, equal to 1.65 kg/h. Since the yield of the electrosynthesis reaction is equal to 90% also two streams of unreacted $N_2$ and $H_2$ are discharged from the reactor. The mass flow rate of unreacted $N_2$ ($\mu_1$) is equal to 0.196 kg/h while the mass flow rate of unreacted NH ($\mu_2$) is equal to 0.042 kg/h.

In order to achieve the results above mentioned, the electrosynthesis reactor must consist of 146 stacks each of which consisting of 10 electrolysis cells (or wafers). The stacks are arranged on 15 batteries each of them containing 10 stacks. Every electrolytic cell have sizes 100×100×1 cm. The inter-stack is equal to 1 cm while the inter-battery distance is equal to 10 cm.

The voltage applied to each electrolytic cell is 0.8 V while the current density is equal to 0.00232 A/cm$^2$. The power consumed for producing 2.15 kg of $NH_3$ is equal to 8.15 KW while the payload is equal to 16525 kg. On the base of these data it is possible to evaluate the power consumption and the footprint sizes of the electrosynthesis reactor (cf. Table 10).

TABLE 10

| Plant unit | Unit of measure | Value |
|---|---|---|
| Unit name | — | $NH_3$ Elettrosynthesis reactor |
| N° of units | — | 1 |
| N° of batteries per unit | — | 15 |
| N° of stacks per battery | — | 10 |
| N° of wafers per stack | — | 10 |
| Payload | kg | 16525.49 |
| Power consumption | kW | 8.1362745 |
| Footprint - area | m$^2$ | 19.36 |
| Footprint - volume | m$^3$ | 38.72 |
| Height (max) | m | 2 |
| Operation time | hours/day | 12 |
| Operation mode | — | Continuous |

The stream of ammonia produced ($\theta$) is then splitted into two separate streams named $\theta_1$ e $\theta_2$ as shown in Table 11.

TABLE 11

| unit of measure | Mass flow rate IN stream $\theta$ | Mass flow rate OUT stream $\theta_1$ | Mass flow rate OUT stream $\theta_2$ |
|---|---|---|---|
| Kg/hr | 2.145 | 0.092 | 2.05 |

Simultaneously the stream of oxygen (o) produced through water electrolysis is splitted into two separate streams named $o_1$ and $o_2$, whose mass flow rates are specified in Tale 12.

TABLE 12

| unit of measure | Mass flow rate IN stream o | Mass flow rate OUT stream $o_1$ | Mass flow rate OUT stream $o_2$ |
|---|---|---|---|
| Kg/hr | 3.365 | 3.122 | 0.024 |

The stream ($o_1$) is conveyed to the ECLSS systems for crew cabin air revitalization. The oxygen stream (o2) is conveyed, together with, the argon stream ($\lambda$), ammonia stream ($\theta$1) and the water stream ($\pi$2), to the unit which produces nitric acid through the Ostwald process. The latter unit produces a mass flow rate of nitric acid ($\rho$) equal to 0.3225 kg/h as well as mass flow rate of flue gas ($\alpha$), consisting mainly of argon, equal to 1.735 kg/h. The power consumption and the footprint size of this unit are shown in Table 13.

TABLE 13

| Plant unit | Unit of measure | Value |
|---|---|---|
| Unit name | — | Unit for production of $HNO_3$ |
| N° of units | — | 1 |
| Payload | kg | 27.25801 |
| Power consumption | kW | 0.0464515 |
| Footprint size (area) | m$^2$ | 0.725805 |
| Footprint size (volume) | m$^3$ | 0.725805 |
| Height (max) | m | 1 |
| Operation time | hours/day | 12 |
| Operation mode | — | Continuous |

The stream of ammonia ($\theta_2$) is further splitted into two separate streams named $\theta_2$' e $\theta_2$", respectively, as shown in Table 14.

TABLE 14

| unit of measure | Mass flow rate IN stream $\theta_2$ | Mass flow rate OUT stream $\theta_2$' | Mass flow rate OUT stream $\theta_2$" |
|---|---|---|---|
| Kg/hr | 2.053 | 2.0 | 0.053 |

Simultaneously the stream of nitric acid (p) is splitted into the two streams $\rho_1$ and $\rho_2$, as shown in Table 15.

TABLE 15

| unit of measure | Mass flow rate IN stream $\rho$ | Mass flow rate OUT stream $\rho_1$ | Mass flow rate OUT stream $\rho_2$ |
|---|---|---|---|
| Kg/hr | 0.322 | 0.197 | 0.125 |

The mass flow rate of ammonia ($\theta$2') is stored in suitable tanks from which $NH_3$ can be withdrawn to be then used as a propellant or as a fertilizer in the biological section. The mass flow rate of nitric acid ($\rho$2) is transferred to the biological section to be used as a source of nitrates in the photobioreactors. On the other hand, the mass flow rates of ammonia ($\theta$2") and nitric acid ($\rho$1) are fed to the absorption-neutralization reactor, where, a mass flow rate of ammonium nitrate ($NH_4NO_3$) equal to 0.25 kg/h is produced: The latter one can be used as fertilizer either in the greenhouses or in the hydroponic systems previously set in the Mars surface. The relevant features of the absorption-neutralization reactor are reported in Table 16.

TABLE 16

| Plant unit | Unit of measure | Value |
| --- | --- | --- |
| Unit name | — | NR (Neutralization Reactor) |
| N° of units | — | 1 |
| Payload | kg | 10 |
| Power consumption | kW | 0.0062 |
| Footprint size (area) | m² | 0.0314 |
| Footprint size (volume) | m³ | 0.0062 |
| Height (max) | m | 0.2 |
| Operation time | hour/day | 12 |
| Operation mode | — | Continuous |

By considering the footprint sizes and the power consumptions of all the plant units so far described, the following summary table can be reported for the chemical physical group of the kit (cf. Table 17).

TABLE 17

| Chemical physical group | Total |
| --- | --- |
| Payload | 73808.57 |
| Power consumption | 498.76 |
| Footprint size (area) | 771.64 |
| Footprint size (volume) | 1261.65 |
| Height (max) | 2* |
| Operation time | 12** |

(*it is a maximum value that is useful for sizing the domes, **average value)

By considering only the plant units of the chemical physical section which operate indoor, the total footprint size is equal to 41.12 m³ as far the volume is concerned and 28 m² as far the area is concerned. The maximum height is equal to 2 m. Theoretically speaking, the last ones should be the minimum sizes of the geodesic dome that houses the indoor units of the chemical physical section. However, it should be noted that the geodesic dome has been oversized with respect to the latter sizes in order to ensure the suitable operating space for workers. Thus the actual sizes of the geodesic dome are the following: radius equal to 4.4 m, volume equal to 174 m3, lateral surface equal to 120 m² and a footprint area equal to 60 m². The payload of the casing of the dome, including joints, is equal to 86 kg while the payload of the ETFE sheets, having a surface area of 120 m², is equal to 24 kg.

As far as the dome pressurization and heating, it should be noted that the minimal thermo-baric conditions which must be assured indoor are T≥283 K and P≥0.8. These conditions are necessary to ensure that the aggregation state of matter of the several compounds involved in the process is the same which they have on Earth.

Thus assuming to use CO2 for pressurizing the dome, the mass of $CO_2$ to blow in is equal to 263.75 kg. Referring to the scheme of FIG. 1 (dashed line) as well as to the data above reported, it can be noted that the TSA unit produces a mass flow rate of $CO_2$ (δ), having pressure of 0.8 bar, equal to about 117.22 kg/h. Such pressurized $CO_2$ can be blown into the dome for a specific period of time during which the $CO_2$ electrolyzer is by-passed. Such a period of time can be evaluated in 2.25 h. Thus during the initial 2.25 h of the process the $CO_2$ outgoing from the TSA units is blown into the dome rather than into the electrolyzer.

For heating the dome until the desired temperature is reached, 38 kW of electric energy, subsequently converted into thermal energy, are consumed. By adding said power consumption to the one needed for powering the units of the chemical-physical section, the overall power consumption is equal to 536765 W. Such power can be supplied by means of a photovoltaic system having the characteristics shown in Table 18.

TABLE 18

| Parameter | Value | Unit of measure |
| --- | --- | --- |
| Solar constant on Mars surface (clean sky) | 303 | W/m² |
| Yield of the phtovoltaic system | 11 | % |
| Specific production of electric energy | 33.33 | W/m² |
| Area of each array of photovoltaic panels | 40 | m² |
| Peak power per array | 1333.2 | W |
| Total peak power to be guaranteed | 536765.8 | W |
| Total area of the phtovoltaic system | 16104.58 | m² |
| Number of arrays to be used | 402 | — |

Thus the photovoltaic system which powers the chemical physical section, including the dome, is about 1.6 ha extended.

Design of the Biological Group of the Kit

Figure 2:
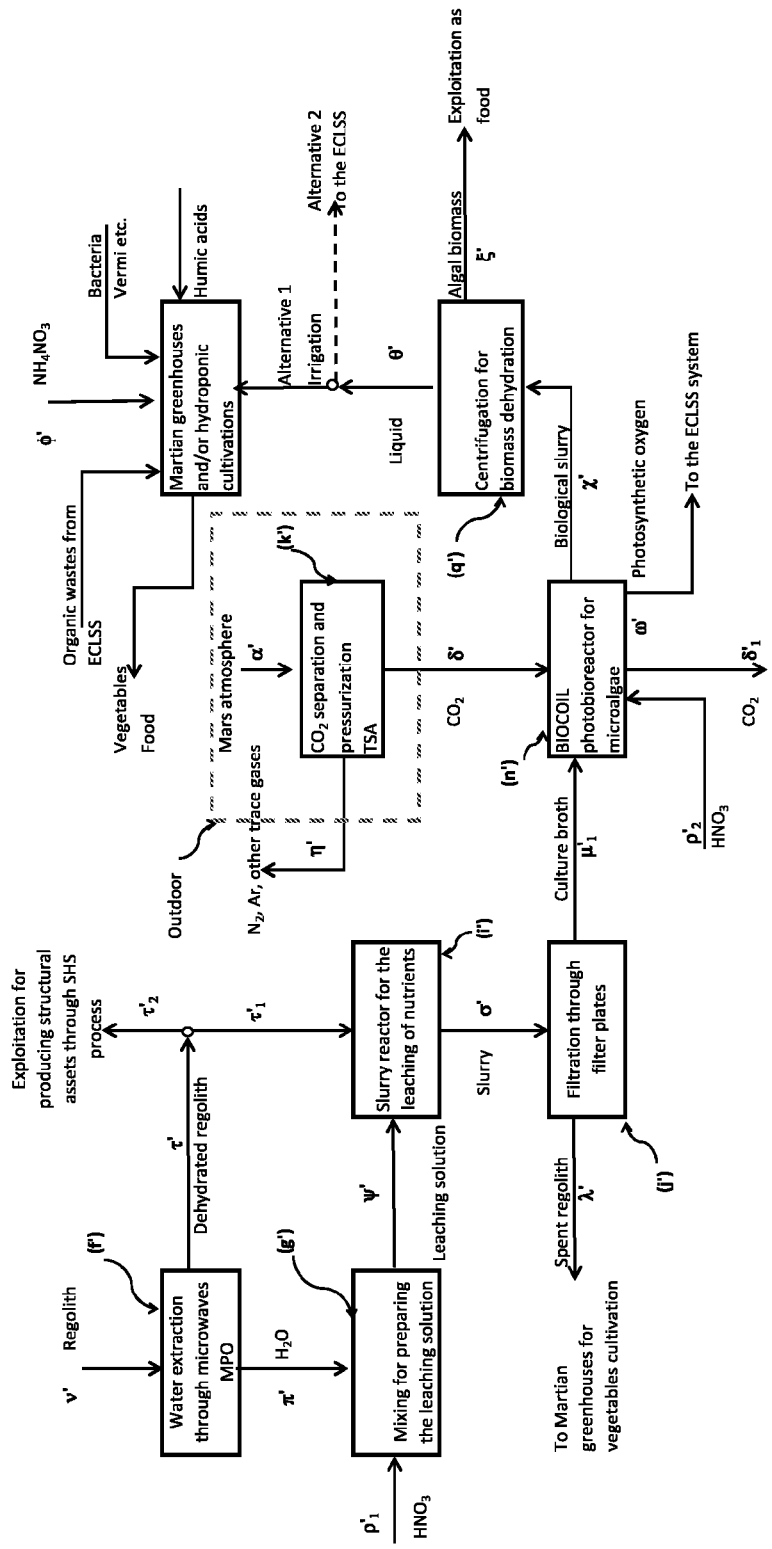
FIG. 2 shows a flow-sheet of the "biological" section is shown according to the Example of the present invention.

As far the biological section is concerned (cf. FIG. 2), a mass flow rate of martian regolith (v') equal to about 5008 kg/h is conveyed to the MPO units where adsorbed and hydration water is extracted through microwave heating as shown in step (f'). The MPO units produce a mass flow rate of water (π') equal to 100.174 kg/h as well as mass flow rate of dehydrated regoltih (τ') equal to 4908.5 kg/h. In order to evaluate the number of MPO units needed to achieve such performances the features of the single MPO unit shown in Table 6 are considered. Thus in order to produce the earlier mentioned mas flow rates of water and dehydrated regolith about 500 MPO units are needed. Therefore, the overall power consumption and footprint sizes of the MPO units can be evaluated as shown in Table 19.

TABLE 19

| Plant Unit | Unit of measure | Value |
| --- | --- | --- |
| Unit name | — | MPO (1') |
| N° of units | — | 500.87 |
| Payload | kg | 10017.4 |
| Power consumption | kW | 1202.08 |
| Footprint size (area) | m² | 34.56 |
| Footprint size (volume) | m³ | 8.64 |
| Height (max) | m | 0.25 |
| Operation time | hours/day | 12 |
| Operation mode | — | Continuous |

The water stream (π') is then mixed with nitric acid in order to obtain an aqueous leaching solution having a concentration of $HNO_3$ equal to about 1 mg/L. Mixing can be performed through direct injection of the mass flow rate of $HNO_3$ (ρ'₁), equal to 0.1 g/h, into the water stream (π'). Hence no specific plant unit is needed for mixing the acid. Such operating step produces a mass flow rate of leaching solution (ψ') equal to about 100.174 kg/h. Simultaneously the mass flow rate (τ') of dehydrated regolith is suitably splitted into two different streams as shown in Table 20.

TABLE 20

| unit of measure | Mass flow rate IN stream τ' | Mass flow rate OUT Stream τ'₁ | Mass flow rate OUT stream τ'₂ |
| --- | --- | --- | --- |
| kg/hr | 4908.5 | 20.0 | 4885.5 |

The mass flow rate of regolith $\tau'_1$ and the mass flow rate of leaching solution ($\psi'$) are then fed into the slurry reactor, where, according to step (i'), the nutrients are transferred from the solid phase (i.e regolith) to the liquid one (i.e. leaching solution) through leaching mechanisms. The slurry reactor, whose characteristics are reported in Table 21, produces at the outlet, a mass flow rate of slurry (a') equal to 120, 2 kg/h. The slurry is 20% wt/wt concentrated in solids.

TABLE 21

| Plant Unit | Unit of measure | Value |
|---|---|---|
| Unit name | — | Slurry Reactor |
| N° of units | — | 1 |
| Payload | kg | 334.8 |
| Power consumption | kW | 2.64 |
| Footprint size (area) | m² | 1.76 |
| Footprint size (volume) | m³ | 3.01 |
| Height (max) | m | 1.52 |
| Operation time | hours/day | 24 |
| Operation mode | — | Continuous |

The stream ($\sigma'$) of slurry is then undergone to a solid-liquid separation phase that is carried out by means of filter plates. At the outlet of the filter the following stream are produced: a solid mass flow rate of leached regolith ($\lambda'$) equal to 20 kg/h and a liquid solution enriched in nutrients ($\mu1'$). The latter one can be used as substrate for producing a culture broth (after supply of $CO_2$ and nitrates) to use for sustaining algal growth. The size and power characteristics of the filter are reported in Table 22.

TABLE 22

| Plant Unit | Unit of measure | Value |
|---|---|---|
| Unit name | — | filter plate |
| N° of units | — | 1 |
| Payload | kg | 86 |
| Power consumption | kW | 0.75 |
| Footprint size (area) | m² | 0.2556 |
| Footprint size (volume) | m³ | 0.184032 |
| Height (max) | m | 0.72 |
| Operation time | hours/day | 12 |
| Operation mode | — | Continuous with cleaning cycle for removing the cake |

Simultaneously to the above described steps, $CO_2$ separation from the Martian atmosphere and its pressurization are carried out. To this aim, according to step (k'), a flow rate of Martian atmosphere ($\alpha'$) equal to 0.74 kg/h is fed into the TSA units where $CO_2$ separation and pressurization is carried out. At the outlet of these units, a flow of pure $CO_2$ ($\delta'$) equal to 0.71 kg/h is produced at a pressure of 0.8 bar and a temperature of 450 K. Simultaneously the TSA units produces a secondary gas stream ($\eta'$), consists mainly of N2 and Ar, equal to 0.03 kg/h at a pressure of 8 mbar and temperatures of 210 K. The characteristics of the TSA units are reported in Table 23.

TABLE 23

| Unit chracteristic | Value | Unit of measure |
|---|---|---|
| Zeolite type | 13X | — |
| Volume of zeolite needed | 0.046 | m³ |
| Length of the zeolite bed | 0.914 | m |
| Diameter of the zeolite bed | 0.254 | m |

TABLE 23-continued

| Unit chracteristic | Value | Unit of measure |
|---|---|---|
| L/D ratio | 3.6 | — |
| Height of the unit | 0.5 | m |
| Irradiation surface for heat exchange | 1.5 | m² |
| Head loss | 8 | torr/$g_{CO_2}$/sec |
| Area of the filter used for removing powder | 0.16 | m² |
| Total power consumed for each bed | 202 | W |
| Payload of each unit | 56 | kg |

The footprint size and the power needed to obtain the pressurized CO2 are reported in Table 24.

TABLE 24

| Plant Unit | Unit of measure | Value |
|---|---|---|
| Unit name | — | TSA (5') |
| N° of units | — | 3 |
| Payload | kg | 168 |
| Power consumption | kW | 0.61 |
| Footprint size (area) | m² | 4.50 |
| Footprint size (volume) | m³ | 2.25 |
| Height (max) | m | 0.50 |
| Operation time | ore/giorno | 12 |
| Operation mode | — | Continue |

Figure 3:
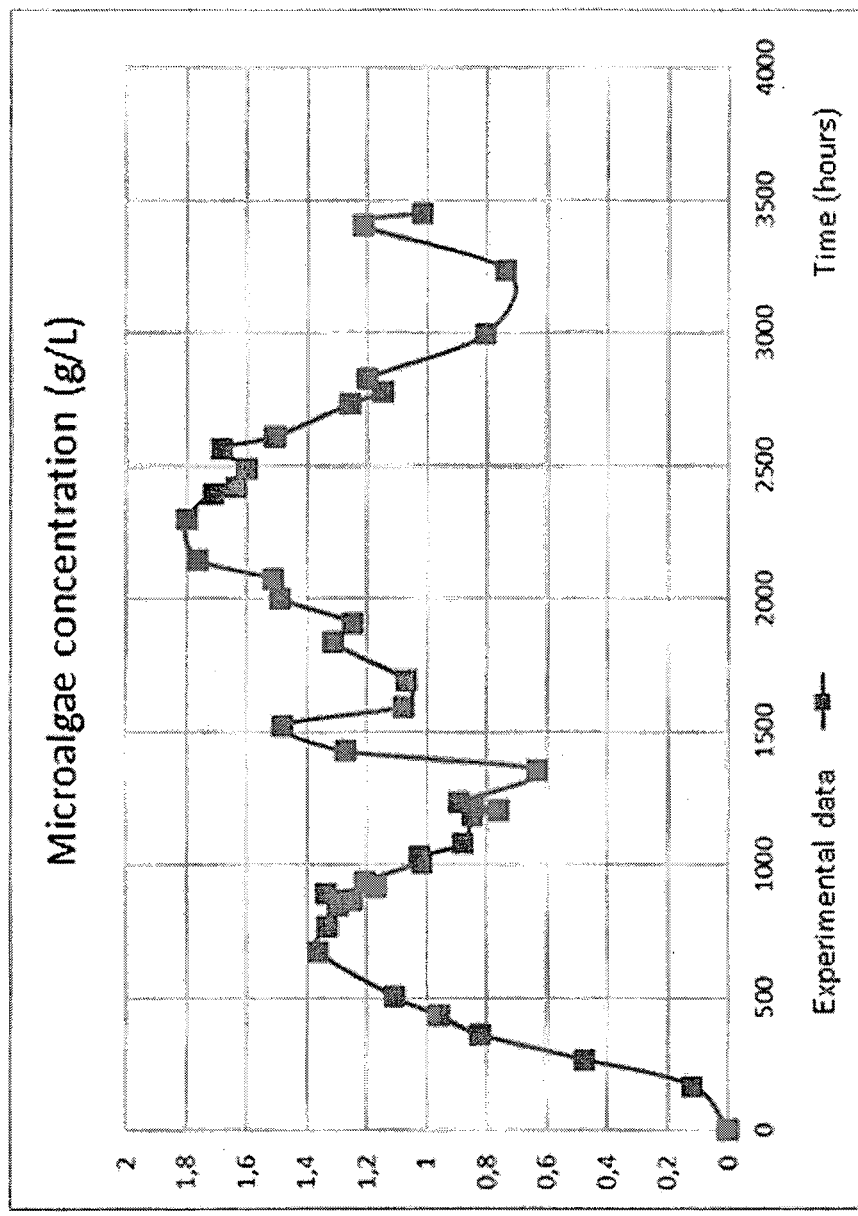
FIG. 3 the concentration algal biomass as function of culture time obtained during specific experimental trials.

According to the operating step (n'), the stream ($\delta'$) of pressurized $CO_2$, the stream ($\mu'_1$) of nutrient solution as well as the stream ($\rho'_2$) of nitric acid, are fed into the BIOCOIL photobioreactor where the desired algal strain has been previously inoculated. In order to correctly design the photobioreactor, i.e. to evaluate the flows of nitric acid to be used and the algal biomass and photosynthetic oxygen produced, a specific experimental activity has been performed. The latter one has been carried out by using a Biocoil photobioreactor operated in fed-batch mode and fed by a gas stream of pure $CO_2$ (i.e. 100% v/v) supplied continuously. In FIG. 3 the experimental results are shown in term of algae concentration as a function of culture time. From FIG. 3 it can be observed that, under the above conditions, algal growth was sustained for about 5 months.

Thus, the experimental trials carried out using a gas stream which, in terms of composition is very similar to the one obtainable on Mars as well as a light flux which simulates the Martian one, showed that it is possible to continuously produce algal biomass, under conditions very similar to the ones obtainable within the dome which houses the photobioreactor for a period of time (i.e 5 months) similar to duration of the mission on Mars. On the base of the experimental and modelling results the following operating parameters of the photobioreactor which has to be implemented on Mars surface are shown in Table 25.

TABLE 25

| Parameter | Value | Unit of measure |
|---|---|---|
| Biomassa productivity ($\xi'$) | 0.095 | kg/h |
| Nitrates Consumption | 0.062 | kg/h |
| Liquid consumption | 100.174 | L/h |
| Oxygen productivity | 0.170 | Kg/h |
| $CO_2$ consumption | 0.178 | Kg/h |

By comparing the results of Table 25 with the per-capita needs shown in Table 1 it can be observed that the system, producing about 2.4 kg/day of edible dry biomass, can meet the food needs of 3 crew members.

Simultaneously a mass flow rate of photosynthetic oxygen ($\omega'$) equal to 0.17 kg/h is produced by the photobioreactor. The so produced oxygen can be used in the ECLSS systems for crew cabin air revitalization. To achieve the above mentioned targets, two photobioreactors, having the characteristics reported in Table 26, are needed.

TABLE 26

| Parameter | Value | Unit of measure |
|---|---|---|
| Total effective volume of each photobioreactor | 19.5 | $m^3$ |
| Length of a single coil | 620.70 | m |
| Radius of a single coil | 5 | m |
| circumference of a single coil | 31.415 | m |
| N° of coils | 19 | — |
| Interspace between overlapped coils | 0.05 | m |
| Height of the photobioreactor | 2.85 | m |
| Area of a single coil | 78.5 | $m^2$ |
| Volumetric footprint size of the photobioreactor | 223.83 | $m^3$ |
| Pipe diameter | 0.2 | m |

The power consumption, 62 W, is mainly due to the pumps which assure liquid circulation along the photobioreactor's pipes. The footprint sizes and the power consumption for the whole photobioreactor section are reported in Table 27.

TABLE 27

| Plant Unit | Unit of measure | Value |
|---|---|---|
| Unit name | — | Photobioreactors |
| N° of units | — | 2 |
| Payload | kg | 500 |
| Power consumption | kW | 124.23 |
| Footprint size (area) | $m^2$ | 157.08 |
| Footprint size (volume) | $m^3$ | 447.68 |
| Height (max) | m | 2.85 |
| Operation time | hours/day | 12 |
| Operation mode | — | continuous |

The mass flow rate of biological slurry at the outlet of the reactor ($\chi'$) is about 100.24 kg/h. To separate solid algal biomass from the liquid phase, said slurry is conveyed to a centrifugation step through which a mass flow rate of liquid ($\theta'$) equal to 100.15 kg/h and a mass flow rate of dehydrated microalgae ($\xi'$) equal to 0.095 kg/h are obtained. The footprint sizes and the power consumption of the centrifugation unit are reported in Table 28.

TABLE 28

| Plant Unit | Unit of measure | Value |
|---|---|---|
| Unit name | — | Centrifuga |
| N° of units | — | 1 |
| Payload | kg | 450 |
| Power consumption | kW | 7.00 |
| Footprint size (area) | $m^2$ | 1.13 |
| Footprint size (volume) | $m^3$ | 2.12 |
| Height (max) | m | 1.88 |
| Operation time | hours/day | 12 |
| Operation mode | — | continuous |

By considering the footprint sizes and the power consumptions of all the plant units so far described for the biological group, the following summary table can be reported for such group of the kit (cf. Table 17).

TABLE 29

| Biological group of the kit | Total |
|---|---|
| Payload (kg) | 11056.2 |
| Power consumption (kW) | 1213.21 |
| Footprint size - area ($m^2$) | 199.29 |
| Footprint size - Volume ($m^3$) | 463.89 |
| Height (m) | 2.85* |
| Operation time (hours/day) | 12** |

(*it is a maximum value that is useful for sizing the domes, **average value)

In order to design the domes which will house the plant units of the biological section which will operate indoor, the following aspects are considered:

TSA units operate outdoor, thus, their footprint size have not to be considered;

Photobioreactors, which represent the voice that mostly affects the total footprint size, will be housed in dome on its own.

Thus, by accounting for the operating spaces for workers and, by considering all the aspects related to the oversize of the previously mentioned dome which houses the chemical physical section, the characteristics of the domes for the biological section are the following:

Dome for the Biological Section (Photobioreactors Excluded)

This dome has a radius of 4.9 m, volume of 245 $m^3$, a lateral surface of 150 $m^2$ and a footprint area of 75 $m^2$. The payload of the frame, including the joints is 88 kg. The sheet of ETFE, covering the surface area of 150 $m^2$, weighs 30 kg thus leading to a total payload of the dome equal to 118 kg. The mass of $CO_2$ to be injected for pressurizing the dome to 0.8 bar is evaluated to be 371 kg. The $CO_2$ used to pressurize the dome is obtained by the TSA units of the chemical physical section by-passing the $CO_2$ electrolyzer for about 3.17 hours. The power needed for heating the inner of the dome until a minimal temperature of about 283 K is reached, is evaluated to be 44 kW.

Dome for the Phorobioreactors

This dome has a radius of 9.5 m, volume of 1795 $m^3$, a lateral surface of 567 $m^2$ and a footprint area of 283 $m^2$. The payload of the frame, including the joints is 88 kg. The sheet of ETFE, covering the surface area of 567 $m^2$, weighs 113 kg thus leading to a total payload equal to 300 kg. The mass of $CO_2$ to be injected for pressurizing the dome to 0.8 bar is evaluated to be 17900 kg. The $CO_2$ used to pressurize the dome is obtained by the TSA units of the chemical physical section by-passing the $CO_2$ electrolyzer for about 153 hours. The power needed for heating the inner of the dome until a minimal temperature of about 283 K is reached, is evaluated to be 320 kW.

The photovoltaic system has to supply the energy needed for powering all the plant units constituting the biological section as well as the energy needed for keeping the inner of the domes to a temperature of at least 283° K.

By adding the power needed to heat the domes to the one required by the plant units, a total power consumption of 1577209 W can be evaluated. Such electric power can be produced through the photovoltaic system whose characteristics are reported in Table 30.

TABLE 30

| Parameter | Value | Unit of measure |
|---|---|---|
| Solar constant on Mars surface (clean sky) | 303 | $W/m^2$ |
| Yield of the photovoltaic system | 11 | % |
| Specific production of electric energy | 33.33 | $W/m^2$ |
| Area of each array of photovoltaic panels | 40 | $m^2$ |
| Peak power per array | 1333.2 | W |
| Total peak power to be guaranteed | 1577209.0 | W |
| Total area of the phtovoltaic system | 47321.002 | $m^2$ |
| Number of arrays to be used | 1183 | — |

Therefore 1183 arrays have to be used and the corresponding footprint area of the photovoltaic system which powers the biological section is equal to 4.7 ha of Mars soil. The results of the example described so far are summarized in Table 31, in terms of energy and materials production by both groups of the kit (i.e. chemical physical and biological section).

TABLE 31

| Material produced | Unit of measure | Value | Usage |
|---|---|---|---|
| Oxygen | kg/h | 41.66 | Air revitalization and/or combustion air |
| Water | kg/h | 3.85 | Drinking and/or hygienic water |
| Ammonia | kg/h | 2.00 | Propellant and/or fertilizer |
| Mixture of CO + CO2 | kg/h | 78.86 | Propellant |
| Nitric acid | kg/h | 0.13 | Fertilizer and/or leachant |
| Ammonia nitrate | kg/h | 0.25 | Fertilizer |
| Hydrogen ($\mu_2$) | kg/h | 0.04 | Propellant or water production |
| Buffer gas | kg/h | 0.03 | Air revitalization and/or analytic equipment |
| Nutrient liquid | kg/h | 100.00 | Crops irrigation and/or water production |
| Commestibile biomass | kg/h | 0.09 | Food for astronauts |
| Dehydrated regolth | kg/h | 4888.49 | Manufacturing of structural assets |
| Energy | MW | 2.11 | Energetic sustainment of the whole plant |

The overall payload of the mission is summarized in Table 32.

TABLE 32

| Element | Unit of measure | Value |
|---|---|---|
| Dome for chemical physical section | kg | 86 |
| Dome for biological section (excluded photobioreactors) | kg | 118 |
| Dome for photobioreactors | kg | 300 |
| Plant units of chemical physical section | kg | 73809 |
| Plant units of biological section | kg | 11056 |
| Total | | 85369 |

From the detailed description and from the example above, the advantages achieved through the kit and the process of the invention are apparent. In particular, the kit allows to implement the process of the invention by providing all materials and equipment that will be applied on the Martian soil for the production of materials such as water, oxygen, propellants, fertilizers, edible biomass and vegetables starting only from Martian resources, thus making the missions fully self-sustaining once the process of the invention is integrated with suitable ECLSS Systems.

The invention claimed is:

1. A process for the production of oxygen, water, carbon monoxide, ammonia, nitrogen-based fertilizers and edible biomass on Martian regolith through the use of available resources in situ, said process comprising a chemical-physical section for producing the oxygen, water, carbon monoxide, ammonia, and nitrogen-based fertilizers, and a biological section for producing the edible biomass, said chemical-physical section comprising:

a) assembling on a Martian surface at least one chemical-physical geodesic dome to house a first set of plant units operating in an interior of the at least one chemical-physical geodesic dome;

b) assembling a first set of photovoltaic panels outside of the at least one chemical-physical geodesic dome to produce energy needed for heating inside the at least one chemical-physical geodesic dome and for a first powering plant of said first set of plant units;

c) assembling a first variable-temperature adsorption unit (Temperature Swing Absorber or TSA) and a first solid-state dehumidifier (Water Vapor Adsorption Reactor or WAVAR) outside of the at least one chemical-physical geodesic dome;

d) blowing pressurized Martian $CO_2$ into said at least one chemical-physical geodesic dome, through the first TSA, until an internal pressure not less than 0.8 bar is achieved;

e) heating the interior of said at least one chemical-physical geodesic dome until a temperature not less than 10° C. is achieved, through heating systems powered by said first set of photovoltaic panels;

f) assembling a first structure for mechanical protection of a second set of plant units operating outside of the at least one geodesic dome;

g) placing in the interior of the at least one chemical-physical geodesic dome the first set of plant units for the production of the nitrogen-based fertilizers;

h) conveying gas comprising Martian atmosphere to the first WAVAR unit, for atmospheric water extraction;

i) excavating and conveying the Martian regolith to a first microwave system operating in the interior of the at least one chemical-physical geodesic dome, for extraction of adsorbed water and minerals by microwaves;

j) conveying the water extracted from the gas comprising Martian atmosphere to a first storage tank;

k) splitting the absorbed water extracted from the Martian regolith into three streams ($\pi 1$, $\pi 2$ and $\pi 3$);

l) conveying the water stream $\pi 1$ to a first electrolyzer operating in the interior of the at least one geodesic dome to produce two distinct streams of $H_2$ and $O_2$;

m) conveying dehydrated atmosphere output from the first WAVAR to the first TSA for separation and pressurization of $CO_2$, based on cycles of adsorption-desorption at variable temperatures on zeolitic materials, simultaneously producing a second gas stream comprising $N_2$ and Ar;

n) conveying the separated and pressurized $CO_2$ to the first electrolyzer for the production of $O_2$ and a gas stream consisting of a mixture of CO and $CO_2$ to be stored and used as a propellant for extravehicular activity;

o) conveying the second gas stream separated from the first TSA together with $H_2$ produced by electrolysis of water, into a first reactor that allows for production, by electrosynthesis, of gaseous ammonia ($NH_3$), simultaneously producing a stream of Ar which is inert during the reactive process leading to the production of $NH_3$;

p) splitting the stream of produced $NH_3$ into two streams (⊖1 and ⊖2);

q) conveying the stream of Ar coming from the electrosynthesis step (o), together with the stream ⊖1 of $NH_3$ (p), with the oxygen, produced as per step (l), with the stream of water π2 produced as per step (k), to a unit for the production of nitric acid ($HNO_3$) and an exhaust gas comprising Ar, which operates on the basis of an Ostwald process;

r) splitting the stream of the produced $HNO_3$ into two streams (ρ1 and ρ2);

s) further splitting the stream π2 of $NH_3$ produced as per step (p) into two streams π2' and π2")

t) conveying the stream π2' to a second storage tank from which the $NH_3$ is drawn to be used as a propellant for extravehicular activity or as a fertilizer in hydroponics;

u) conveying the stream ρ1 of $HNO_3$ together with the stream π2" of $NH_3$, produced as per step (s) in a second reactor for absorption and neutralization, which allows the production of ammonium nitrate ($NH_4NO_3$) to be used as the nitrogen-based fertilizer; and said biological section comprising the steps of:

a') assembling on the Martian surface at least one biological geodesic dome to house a third set of plant units operating in an interior of the at least one biological geodesic dome;

b') assembling a second set of photovoltaic panels outside of the at least one biological geodesic dome to produce energy needed for heating inside the at least one biological geodesic dome and for a second powering plant of said third set of plant units;

c') assembling a second variable-temperature adsorption unit (Temperature Swing Absorber or TSA) and a second solid-state dehumidifier (Water Vapor Adsorption Reactor or WAVAR) outside of the at least one biological geodesic dome;

d') blowing pressurized Martian $CO_2$ into said at least one biological geodesic dome, through the second TSA, until an internal pressure not less than 0.8 bar is achieved;

e') heating the interior of said at least one biological geodesic dome until a temperature not less than 10° C. is achieved, through heating systems powered by said second set of photovoltaic panels;

f') excavating and conveying the Martian regolith to a second microwave system operating in the interior of the at least one biological geodesic dome, for extraction of adsorbed water and minerals by microwaves;

g')mixing the water produced with suitable amounts of the nitric acid produced in said chemical-physical section;

h') splitting the dehydrated Martian regolith produced as per step (f') into two distinct solid streams ($\tau_1$' and $\tau_2$');

i') conveying the water mixed with nitric acid produced in step (g') together with the solid stream $\tau_1$' of Martian regolith in a leaching reactor for the transfer of micro- and macronutrients from a solid phase to a liquid phase;

j') conveying a mixture of solid and liquid (slurry) coming from the leaching reactor to a filtration system for the separation of the solid (leached regolith) from the liquid enriched in micro- and macronutrients (culture broth);

k') conveying the Martian atmosphere to the second TSA of separation and pressurization of $CO_2$, based on cycles of adsorption-desorption at variable temperatures on zeolitic materials, simultaneously producing a second gas stream comprising $N_2$ and Ar;

l') storing said second gas stream of $N_2$ and Ar, produced as per step (k'), in suitable containers from which it can be drawn to be used as a buffer gas in an analytical apparatus used during sampling steps to be carried out for scientific purposes during a mission;

m') preparing an inoculum of suitable algal strains brought from Earth;

n') conveying the culture broth produced as per step (j'), together with the pressurized stream of $CO_2$, produced as per step (k'), together with $HNO_3$, produced in said chemical-physical section, and the inoculum produced as per step (m'), in at least one photobioreactor to be used to promote algal growth;

o') performing the $CO_2$ absorption in the liquid phase through systems based on hydropneumatic pumps (airlift) that allow proper mixing of components conveyed in the photobioreactor, and adequate circulation of the mixture of algae and culture medium (biological slurry);

p') exposing the at least one photobioreactor to a light source capable of promoting photosynthesis, thus resulting in the formation of a new photosynthetic algae biomass and oxygen;

q') separating the algal biomass from the culture broth by centrifugation and oxygen by degassing;

r') storing oxygen to be conveyed to ECLSS sections (Environmental Control and Life Support System) in a sealed and pressurized tank, and further dehydrating algal biomass in order to use it as food or a dietary supplement;

s') transferring the culture broth spent in step (q'), together with ammonium nitrate ($NH_4NO_3$) produced in the chemical-physical section, the leached regolith, produced as per step (j'), with appropriate amounts of humic and fulvic acids brought from Earth, and human metabolic wastes, into domes where plantations for food are grown.

2. The process of claim 1, wherein in step (g'), the water and the nitric acid are in 1:5 ratio.

3. The process of claim 1, wherein in step (i'), a contact time between the liquid phase and the solid phase is approximately 24 hours.

4. The process of claim 1, wherein in the step (p'), said light source is incident solar radiation on the Martian surface, or a system of solar concentrators and optical fibers.

5. The process of claim 1, wherein the step (s') comprises the following sub-steps:

s'1) recreating inside the dome to be used as a greenhouse on Mars, the conditions of temperature and pressure compatible with the growth of desired plant species;

s'2) conveying the leached regolith produced as per step (j') to the dome, which functions as a greenhouse;

s'3) mixing the regolith of the sub-phase (s'2) with ammonium nitrate ($NH_4NO_3$) produced in step (u) of the chemical-physical section to ensure a proper intake of nitrogen-based nutrients in the regolith;

s'4) mixing the regolith and the ammonium nitrate with suitable amounts of humic and fulvic acids;

s'5) mixing with the regolith suitable amounts of organic waste coming from houses of astronauts to increase the soil organic matter content;

s'6) proceeding with planting of plant species;

s'7) irrigating crops by using the spent solution coming from the centrifuges; and s'8) providing a light flow needed for photosynthesis.

6. A kit of materials and apparatus for the implementation of the process of claim 1, comprising a chemical-physical group of materials and a biological group of materials, said chemical-physical group comprising:
- at least one chemical-physical geodesic dome to house various units used in the chemical-physical section of the process;
- at least one first photovoltaic panel for producing the energy for heating the atmosphere inside the at least one chemical-physical geodesic dome and for functioning the plant units associated with the chemical-physical geodesic dome;
- at least one first TSA comprising of at least one adsorbent bed of zeolite and at least one first radiator having a function to ensure heat exchange with a natural environment of Mars to allow the execution of adsorption-desorption cycles at variable temperature, for separating $CO_2$ from other constituents of the Martian atmosphere gases (mainly $N_2$ and Ar), and pressurizing the separated $CO_2$, as well as blowing and putting the same pressure of $CO_2$ into the at least one chemical-physical geodesic dome;
- at least one WAVAR based on the use of zeolites and adsorption process, followed by desorption with microwaves, for the extraction of water present in the Martian atmosphere;
- at least one storage tank for water extracted from the atmosphere of Mars;
- at least one first excavator and at least one first conveyor belt for the excavation and conveyance of the Martian regolith to the unit for processing;
- at least one first microwave system, including at least one magnetron for the extraction of water adsorbed and hydration from the Martian regolith by using microwave heating;
- at least one pipe connector having three outputs for splitting the water extracted from the Martian regolith into three streams $\pi 1$, $\pi 2$ and $\pi 3$);
- at least one electrolyzer for electrolysis of water of the stream $\pi 1$ and the production of hydrogen and oxygen;
- at least one electrolyzer for electrolysis of $CO_2$ and obtaining separated oxygen and a mixture of CO and $CO_2$;
- at least one unit consisting of at least one electrosynthesis reactor with solid electrolyte (Solid oxide fuel cell) for the production of ammonia from gas with a high content of $N_2$ and Ar produced into the TSA and hydrogen obtained by electrolysis of water;
- at least one unit consisting of a first connector for splitting the stream of produced ammonia in two streams ($\ominus 1$ and $\ominus 2$);
- at least one unit for the production of nitric acid ($HNO_3$) by an Ostwald process from Ar, $NH_3$, $H_2O$, $O_2$, said unit comprising at least one catalytic reactor, at least one absorption tower and at least one system for stripping NOx;
- at least one unit consisting of a second connectors for splitting the stream of produced nitric acid ($HNO_3$) in two streams ($\rho 1$ and $\rho 2$);
- at least one unit consisting of a third connector for splitting the stream $\ominus 2$ into further two streams ($\ominus 2'$ and $\ominus 2''$);
- at least one storage tank for the $NH_3$ produced; and
- at least one gas-liquid reactor operating continuously for the production of $NH_3$ and $NH_4NO_3$ from $HNO_3$, and said the biological group comprising:
- at least one biological geodesic dome to house various units used in the biological section of the process;
- at least one second photovoltaic panel for producing the energy for heating the atmosphere inside the at least one biological geodesic dome and for functioning the plant units associated with the chemical-physical geodesic dome;
- at least one second TSA comprising of at least one adsorbent bed of zeolite and at least one second radiator having a function to ensure heat exchange with the natural environment of Mars to allow the execution of adsorption-desorption cycles at variable temperature, for separating $CO_2$ from other constituents of the Martian atmosphere gases (mainly $N_2$ and Ar), and pressurizing the separated $CO_2$, as well as blowing and putting the same pressure of $CO_2$ into the at least one biological geodesic dome;
- at least one second excavator and at least one second conveyor belt for the excavation and conveyance of the Martian regolith to the unit for processing;
- at least one second microwave system, including at least one magnetron for the extraction of water adsorbed and hydration from the Martian regolith by using microwave heating;
- at least one unit for mixing the water extracted from the Martian regolith with suitable amounts of nitric acid produced in the chemical-physical section;
- at least one unit consisting of a two-way conveyor belt for splitting the Martian regolith dehydrated in two solid streams ($\tau_1'$ and $\tau_2'$);
- at least one reactor operating continuously for leaching of solid stream $\tau_1'$ of Martian regolith with a mixture of water and nitric acid;
- at least one unit consisting of a plate filter for the solid/liquid separation to be performed on the slurry outing the leaching reactor and the simultaneous production of culture broth and a stream of leached regolith;
- at least one tank for storing $N_2$ and Ar-based gas obtained by the previous unit as a result of separation from $CO_2$;
- at least one of the following algal strains: *Gloeocapsa* strain OU_20, *Leptolyngbya* OU_13 strain, *Phormidium* strain OU_10, *Chroococcidiopsis* 029; *Arthrospira platensis, Synechococcus elongatus, Anabaena cylindrical; Chlorella vulgaris; Nannochloris Eucaryotum* or genetically modified strains;
- at least one unit for the preparation of the inoculum of algal strains;
- at least one photobioreactor for the production of algal biomass, wherein the culture broth contacts the algal inoculum, with nitric acid and the gas stream having a high content of $CO_2$ named $\ominus 2$;
- at least one hydropneumatic pump type airlift for the absorption of $CO_2$ in the liquid phase, the proper degree of mixing between components conveyed in the photobioreactor and the circulation of the biological slurry;
- at least one unit for the separation of algal biomass and oxygen produced in the photobioreactor from the spent culture broth;
- at least one tank for storing oxygen produced by the photobioreactor;
- at least one unit for the dehydration of algal biomass, and
- at least one greenhouse geodesic dome to be used as a greenhouse for growing edible plants.

7. The kit of claim 6, wherein said at least one photobioreactor is of fed-batch type.

8. The kit of claim 6, wherein in said at least one photobioreactor, the oxygen level is lower than 400% of the corresponding values of water saturation.

* * * * *